US007916728B1

(12) United States Patent
Mimms

(10) Patent No.: US 7,916,728 B1
(45) Date of Patent: Mar. 29, 2011

(54) LOCKLESS ATOMIC TABLE UPDATE

(75) Inventor: Alan Mimms, Spokane, WA (US)

(73) Assignee: F5 Networks, Inc., Seattle, WA (US)

( * ) Notice: Subject to any disclaimer, the term of this patent is extended or adjusted under 35 U.S.C. 154(b) by 146 days.

(21) Appl. No.: 12/240,935

(22) Filed: Sep. 29, 2008

Related U.S. Application Data

(60) Provisional application No. 60/976,228, filed on Sep. 28, 2007.

(51) Int. Cl.
*H04L 12/56* (2006.01)
(52) U.S. Cl. ............. 370/392; 370/395.31; 370/389
(58) Field of Classification Search ............. 370/395.1, 370/230.1, 230.235, 392, 395.31; 711/226; 709/238
See application file for complete search history.

(56) References Cited

U.S. PATENT DOCUMENTS

| 6,115,802 | A  | * | 9/2000 | Tock et al. ............... 711/216 |
| 6,529,508 | B1 | * | 3/2003 | Li et al. ................... 370/392 |
| 6,781,990 | B1 | * | 8/2004 | Puri et al. ................ 370/392 |
| 7,355,977 | B1 | * | 4/2008 | Li ......................... 370/235.1 |
| 7,558,910 | B2 | * | 7/2009 | Alverson et al. ............ 711/110 |
| 7,571,299 | B2 | * | 8/2009 | Loeb ....................... 711/216 |
| 7,668,851 | B2 | * | 2/2010 | Triplett ................... 711/216 |
| 7,688,727 | B1 | * | 3/2010 | Ferguson et al. .......... 370/230.1 |
| 2006/0007928 | A1 | * | 1/2006 | Sangillo .................. 370/389 |
| 2009/0003204 | A1 | * | 1/2009 | Okholm et al. ............. 370/230 |

OTHER PUBLICATIONS

KJ (Ken) Salchow, Jr.; "*Clustered Multiprocessing: Changing the Rules of the Performance Game*"; F5 Networks, Inc.; 2008 (11 pages).

* cited by examiner

*Primary Examiner* — William Trost, IV
*Assistant Examiner* — Emmanuel Maglo
(74) *Attorney, Agent, or Firm* — LeClairRyan

(57) ABSTRACT

Upon detecting a data event initiating an update to a table, a first classifier index associated with the data event is identified. From a classifier table, the current position in a first dimension of the table associated with the classifier index is determined. An open position in the first dimension of the table is also identified. Updated data is stored in the open position within the table. In the classifier table, the open position storing the updated data is associated with the classifier index.

24 Claims, 20 Drawing Sheets

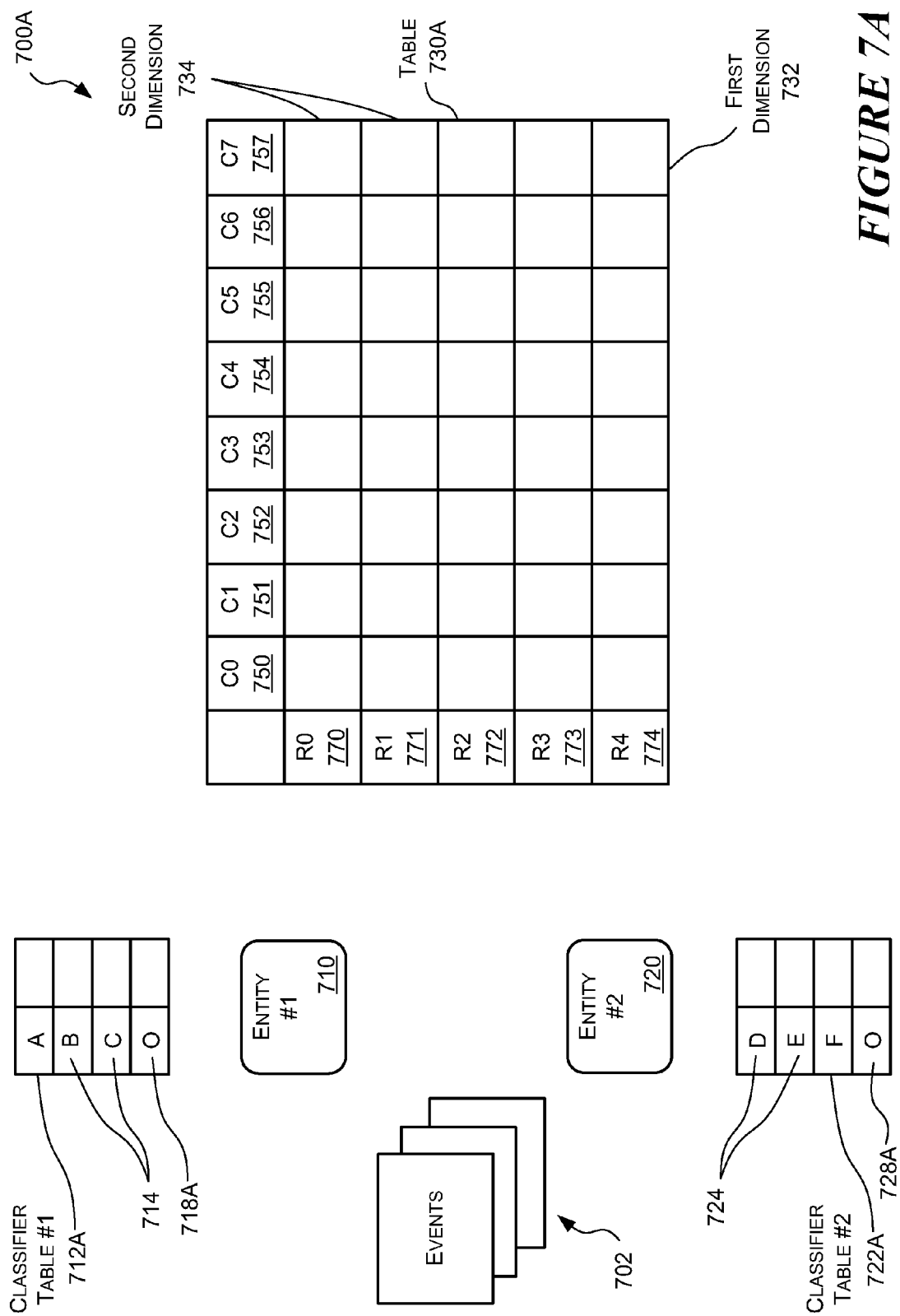

LOCKLESS ATOMIC TABLE UPDATE

CROSS-REFERENCE TO RELATED APPLICATION

This application claims the benefit of U.S. Provisional Patent Application No. 60/976,228, filed Sep. 28, 2007, the contents of which is hereby incorporated by reference herein in its entirety.

BACKGROUND

The usage of data networks has increased tremendously over the past decades. With increased reliance on network-based applications, including e-commerce, on-line entertainment, voice-over Internet protocol (VoIP) telephony, and countless others, demand on data networks will only continue to grow. As a result of this growing demand, data network performance will have to continue to increase to service this demand.

To support improved data network performance, routers and other traffic management devices will have to direct resource requests at increasingly higher speeds to direct data packets or other data events between their sources and destinations. Traffic management devices frequently use tables to facilitate packet routing: upon identifying some attribute presented by or derived from the packet, the traffic management device performs a table lookup on that attribute to determine the destination to which the packet should be routed.

One issue that may cause delays in routing packets arises when the table must be updated to store a new or updated destination for a packet associated with a particular transmission. While the table is being updated, typically at least a portion of the table is locked and cannot be accessed. Traffic management devices may need information in the locked portion to route packets. However, because there may be no way to store and then later route these packets while continuing to process incoming traffic when the table is locked, these packets may be dropped and resent. Resending the packets results in increased traffic, reducing network performance.

SUMMARY

According to one embodiment, a method provides uninterrupted access to a network traffic handling table during table updates. The method includes identifying a first classifier index associated with a data packet received by one of a plurality of traffic management devices. An initial table position is determined from a first classifier table in a first dimension of the network traffic handling table. The classifier table associates classifier indices with table positions such that the initial table position is associated with the first classifier index. An initial open table position is determined in the first dimension of the network traffic handling table. Information associated with the data packet is stored within the initial open table position in the network traffic handling table. The initial open table position is associated with the first classifier index in the first classifier table.

According to another embodiment, a method provides uninterrupted access to a network traffic handling table during table updates. The method comprises receiving a data packet in one of a plurality of traffic management entities and identifying a first classifier index associated with the data packet. A second classifier index is identified that is associated with the data packet. A first classifier table is accessed to determine a first position in a first dimension of the network traffic handling table associated with the first classifier index. The first classifier table references positions in the first dimension of the network traffic handling table that are mutually disjoint with other positions in the network traffic handling table managed by one or more other traffic management entities. An open position is determined in the first dimension of the table associated with the traffic management entity. Existing packet handling data is copied from the current position to one or more corresponding locations in the second dimension in the open position in the network traffic handling table. Updated packet handling data is stored within the open position in the network traffic handling table at a second dimension location indicated by the second classifier index. The open position is associated with the classifier index in the classifier table. The open position becomes a new current position associated with the first classifier index. The current position previously associated with the first classifier index is designated as a new open position in the network traffic handling table associated with the one traffic management entity.

According to yet another embodiment, a machine readable medium stores machine executable instructions, which when executed on one or more processors, causes a network traffic manager system to perform one or more instructions. The instructions include maintaining a table configured to store data in a plurality of cells existing at intersections of positions in a first dimension of the table and locations in a second dimension of the table. A classifier table is maintained for entities authorized to update the table. Maintaining of the classifier table includes associating the positions in the first dimension of the table with a classifier index and receiving a classifier index update to associate a previously open position in the first dimension of the table with a classifier index previously associated with another position whose contents were superseded in the update. An open position indicator is maintained for the entities authorized to update the table. The open position indicator is configured to indicate a position available to receive an update without writing in the positions associated with a classifier index in the classifier table. An open position update is received to identify the other position whose contents were superseded in the update.

According to another embodiment, a system provides uninterrupted access to a network traffic handling table during table updates. The system includes a table configured to store data relating to a plurality of data events. The table includes a plurality of positions in a first dimension configured to store data associated with a classifier index and an open position configured to receive an update. A classifier table is configured to associate a plurality of classifier indices with positions in the table. An open position indicator is configured to identify the open position. A traffic management entity is configured to receive a data event, identify a first classifier index associated with the data event, consult the classifier table to identify a current position associated with the first classifier index, and consult the open position indicator to identify the open position. The traffic management entity is further configured to store new data in the open position, update the classifier table to associate the first classifier index with the open position that has received the update, and update the open position indicator to identify the current position that was superseded by the update.

In yet another embodiment, a traffic manager device provides uninterrupted access to a network traffic handling table during table updates. The apparatus comprises a memory for storing a set of computer executable instructions, a network transceiver configured to receive network traffic, and a processor configured to execute the set of stored computer executable instructions. The set of instructions includes receiving a data packet, identifying a first classifier index associated with the data packet, identifying a second classifier index associated with the data packet, and accessing a first classifier table to determine a first position in a first dimension of the network traffic handling table associated with the first classifier index. The first classifier table references positions in the first dimension of the network traffic handling table that are mutually disjoint with other positions in the network traffic handling table managed by one or more other entities. The instructions also include determining an open position in the first dimension of the table associated with the entity, copying existing packet handling data from the current position to one or more corresponding locations in the second dimension in the open position in the network traffic handling table, and storing updated packet handling data within the open position in the network traffic handling table at a second dimension location indicated by the second classifier index. The instruction further provide for associating the open position with the classifier index in the classifier table, wherein the open position becomes a new current position associated with the first classifier index, and designating the current position previously associated with the first classifier index as a new open position in the network traffic handling table associated with the entity.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

The detailed description is described with reference to the accompanying figures. In the figures, the left-most digit of a three-digit reference number or the two left-most digits of a four-digit reference number identify the figure in which the reference number first appears. The use of the same reference numbers in different figures indicates similar or identical items.

FIGS. 7A-7D and 8A-8B are block diagrams of another implementation of classifier tables used by one or more entities perform lockless atomic updates on portions of a two-dimensional table.

DETAILED DESCRIPTION

Overview

Having to lock a table or a portion of a table while it is being updated may result in data communications delays. The present invention allows for portions of tables to be updated without having to lock a table or a portion of a table. If the portions of the table are not locked for an update, existing information in those portions of the table may continue to be accessed during the update, helping to eliminate the delaying or dropping of packets while a needed portion of the table is locked and unavailable.

Lockless atomic updating allows for positions to be updated in a table without either the complexity of placing access locks on the table or the delays that may result from resending dropped packets that are received while locking tables or portions of the table. Upon determining a classifier index associated with a data event or packet, a classifier table is consulted to determine the position in the table currently corresponding to the determined classifier index. Updating is performed by copying any existing data from the position in the table corresponding to the determined classifier index to locations in an open position in the table, and storing the updated data in a designated location in the open position. While the updating is taking place, other entities may access the existing data in the position in the table currently corresponding to the determined classifier index without interruption because the update is being applied in a separate, open position in the table. Once the update is complete, the classifier table is updated to associate the previously open position with the classifier. The position in the table formerly corresponding to the determined classifier index, whose contents were superseded by the update, is then made available as the new open position.

Possible Operating Environment for Lockless Atomic Updating

Figure 1:
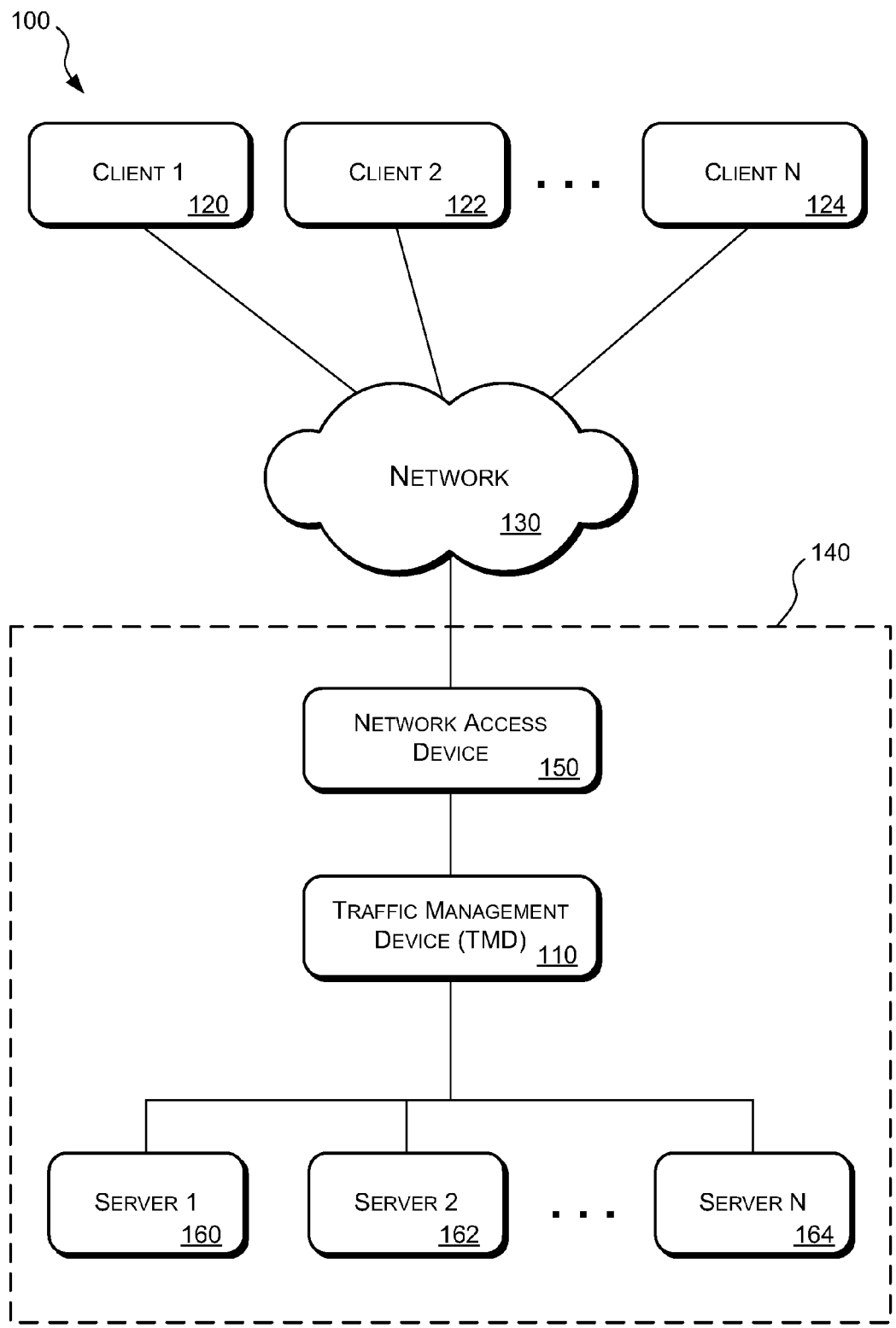
FIG. 1 is a block diagram representing an exemplary operating environment in which a traffic management device directs client requests.

FIG. 1 illustrates an exemplary operating environment 100 of a traffic management device 110. In the exemplary operating environment 100, a plurality of clients, including client 1 120, client 2 122, through client N 124, seek services provided by a plurality of servers, including server 1 160, server 2 162, through server N 164. The clients 120-124 are in communication with a network 130, which may include a public network, such as an Internet, or a private network, such as a dedicated network or a virtual private network. Within the network 130, a domain name server or other routing system (not shown) identifies a resource location 140, which may include a server, a server pool, a virtual server, or another type of resource location sought by the clients 120-124.

At the resource location 140, incoming communications may be received by a network access device 150, such as a router or other switching device, which operably couples the resource location 140 with the network 130. The traffic management device 110, or "TMD," receives from the router 150 client requests for the services provided by one or more of the servers 160-164. The traffic management device 110 then directs the client requests to one of the servers 160-164.

The exemplary operating environment of FIG. 1 illustrates just operating environment in which implementations of the present disclosure may be used. For example, the network access device 150 also may utilize implementations according to the present disclosure, or the servers 160-164 may handle their own network access and/or traffic management functions. For another example, the traffic management device 110 may direct traffic to destinations other than servers, including other server farms, communication systems, or other destinations. Further, the environment 100 may include multiple traffic management devices 110 that may share one or more common tables used in the management of network traffic as described below with reference to FIGS. 3A-3B and other figures.

The following descriptions and examples are directed to the use of implementations of the present disclosure in association with one or more traffic management devices. However, this disclosure is not limited to such uses.

Figure 2:
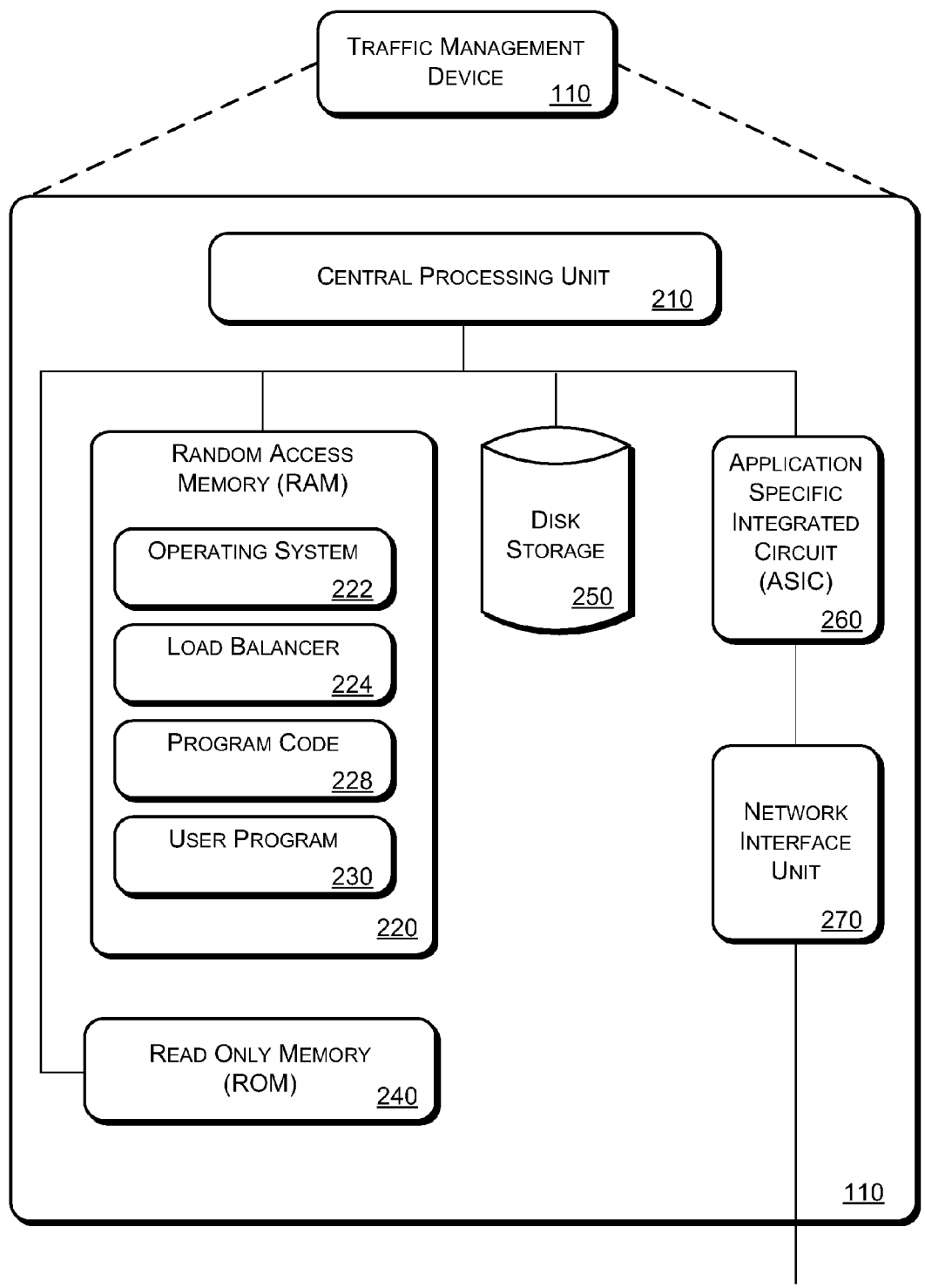
FIG. 2 is a block diagram of the traffic management device shown in FIG. 1.

FIG. 2 is a block diagram of an exemplary implementation of a traffic management device 110 as shown in FIG. 1. The traffic management device 110 of FIG. 2 is a computing system combining both hardware and software components. In other words, the traffic management device of FIG. 2 can be regarded a computing system configured to perform some functions in hardware and others by executing software instructions stored in memory locations.

Specifically, the traffic management device 110 of FIG. 2 includes six general components: a central processing unit 210, random access memory (RAM) 220, read-only memory (ROM) 240, disk storage 250, application specific integrated circuits (ASICs) 260, and a network interface unit 270. The central processing unit 210 is configured to execute instructions stored in the random access memory 220 or the read-only memory 240 to execute the functions of the traffic management device. The random access memory 220 includes a volatile or non-volatile memory system that stores a plurality of programs and/or data retrievable from disk storage 250 or otherwise provided to the random access memory 220.

The random access memory 220 stores programs or sets of instructions that include an operating system 222, a load balancer 224, program code 228, and user programs 230. The operating system 222 facilitates the overall function of the traffic management device 100, including managing how the traffic management device 110 interfaces with internal and external devices and processes various programs. The load balancer 224, implementations of which are described below, distributes client requests for services to different resources, such as servers 160-164 (FIG. 1) with which the traffic management device 110 is associated to balance the workload among those resources. The program code 228 and user program 230 facilitate other functions, such as monitoring the operation of the traffic management device 110 or other functions supported by the provider of the traffic management device 110 or created by a user of the traffic management device 110, respectively.

The read-only memory 240 stores instructions including startup routines and other device-specific functions based on the architecture of the traffic management device 110. The disk storage 250 stores programs and data that will be retrieved into or stored from the random access memory 220. One or more application specific integrated circuits 260 are configured to implement various data communications or frequently used functions in hardware. The network interface unit 270 provides the connections and control logic to receive and transmit data communications over a network and/or to a plurality of associated resources.

Although the traffic management device 110 of FIG. 2 is described as a combined hardware and software system, implementations of the present disclosure may be used with traffic management devices that are implemented in hardware, software, or some combination of both.

For example, the traffic management device 110 may include a plurality of scalable components, including one or more switching components and one or more control components. In such an implementation, the switching components, for one example, may be exclusively hardware components that receive incoming data packets or other data events and, based on information associated with the data events or packets, access tables to identify a destination to which the data events or packets should be routed. If it is determined that a data event or packet is not already associated with a destination, the switching component may direct the data event or packet to a control component to determine a destination to which the data event or packet should be routed. Regardless of how the switch component is implemented, the control component may be implemented in hardware, software, or a combination of hardware and software.

Figure 3A:
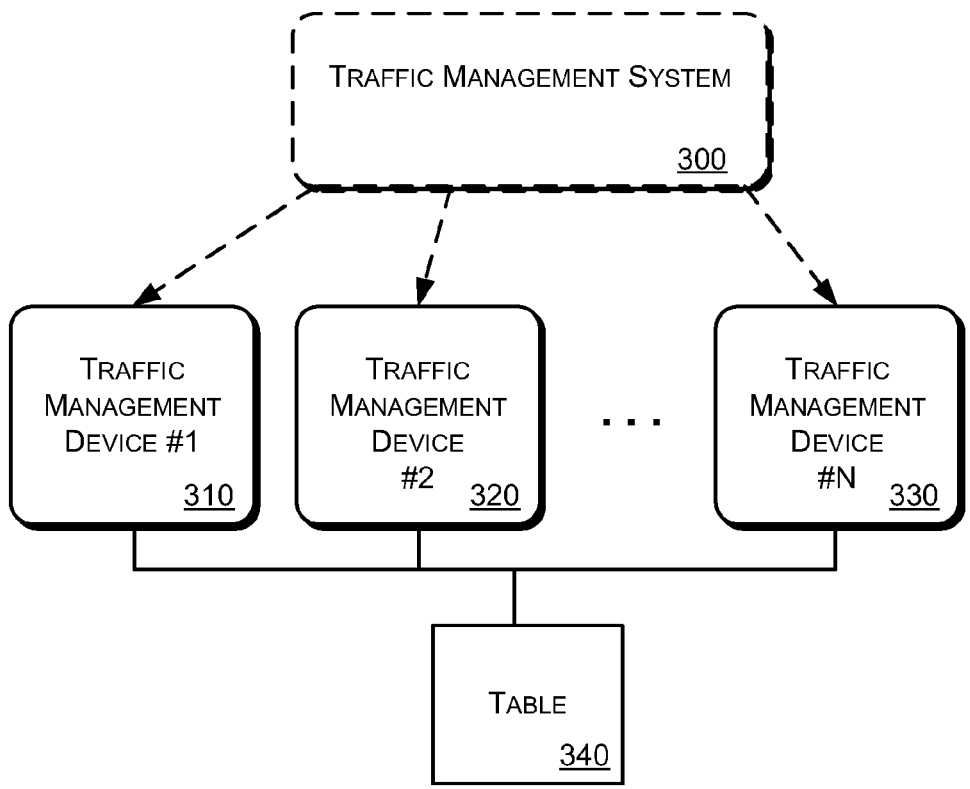
FIGS. 3A and 3B are block diagrams of alternative forms of traffic management devices including multiple devices accessing a common table.
Figure 3B:
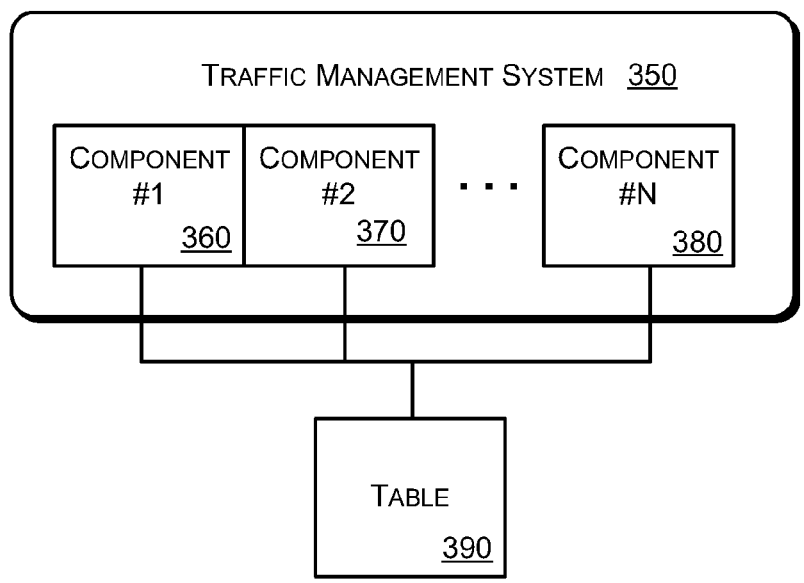

FIGS. 3A and 3B depict, as previously described with reference to FIG. 1, the use of multiple different traffic management devices or multiple different traffic management device components operating as part of a unified traffic management system. FIG. 3A shows a traffic management system 300 that includes multiple traffic management devices including traffic management device #1 310, traffic management device #2 320, through traffic management device #N 330. The traffic management devices 310-330 share the traffic management load applied to the traffic management system 300. The traffic management devices 310-330 may be configured to accommodate data events or packets for different types of transactions or sessions included in the load applied, or may be configured to share in the overall load applied to the traffic management system 300.

In the implementation of FIG. 3A, the traffic management devices 310-330 share in managing the load applied to the traffic management system 300. The traffic management devices 310-330 thus access a common table 340. The table 340 includes information that associates incoming data packets or other data events with flows, servers, or other destinations to which the data events or packets should be directed. By sharing a common table 340, regardless of which of the traffic management devices 310-330 responds to a particular data event or packet, the responding traffic management device can access the table 340 to retrieve the needed information. Also, if the incoming data packet or data event is not listed in the table 340 and the data event or packet must be associated with a destination, the responding traffic management device can update the table 340. Subsequently, each of the traffic management devices 310-330 will be able to direct such data events or packets to the appropriate destination. As described below, implementations of the present disclosure facilitate efficient traffic management by allowing one of the traffic management devices 310-330 to update a portion of the table 340 without locking portions of the table 340. As a result, the other traffic management devices will be able to continue to simultaneously direct other data events or packets, make other updates to the table 340, thereby not delaying or dropping packets as a result of encountering locks on portions of the table 340.

FIG. 3B illustrates a componentized implementation of a traffic management system 350 including a plurality of traffic management components including component #1 360, component #2 370, through component #N 380. Such an implementation may be a rack-based system in which the components 360-380 are blade-type components that can be installed in the rack system to provide for flexible scaling of the traffic management system 350. The components 360-380 each may include a traffic management device configured to handle data event or packet switching and control to manage both data events or packets that are associated with destinations and determine destinations for data events or packets that are not already associated. Alternatively, each of the components 360-380 may include a switching component or a control component to handle the directing of data events or packets associated with destinations and directing of data events or packets that are not already associated, respectively, as previously described.

In an implementation of a traffic management system 350, as in the implementation of the traffic management system 300 of FIG. 3A, the components 360-380 access a common table 390. As previously described with reference to the traffic management system 300 of FIG. 3A, each of the components 360-380 will be able to direct data events or packets to the appropriate destination even if previously processed data events or packets associated with the same destination were previously processed by another component. As described below, implementations of the present disclosure facilitate efficient traffic management by allowing the components 360-380 to update portions of the table 390 without locking portions of the table 390 to the other component. Thus, for example, a switching component will be able to access the table 390 to direct data events or packets even as a control component is updating the table 390.

Examples of Lockless Atomic Table Updating: One-Dimensional Table

FIGS. 4A-6B illustrate examples of implementations of lockless atomic updating in the context of a one-dimensional table. The illustrations both serve to describe operation of implementations of lockless atomic updating in a one-dimensional case and provide a simple context in which to lockless atomic updating. However, as described in subsequent figures, implementations of lockless atomic updating may be used with tables for two or more dimensions.

Figure 4A:
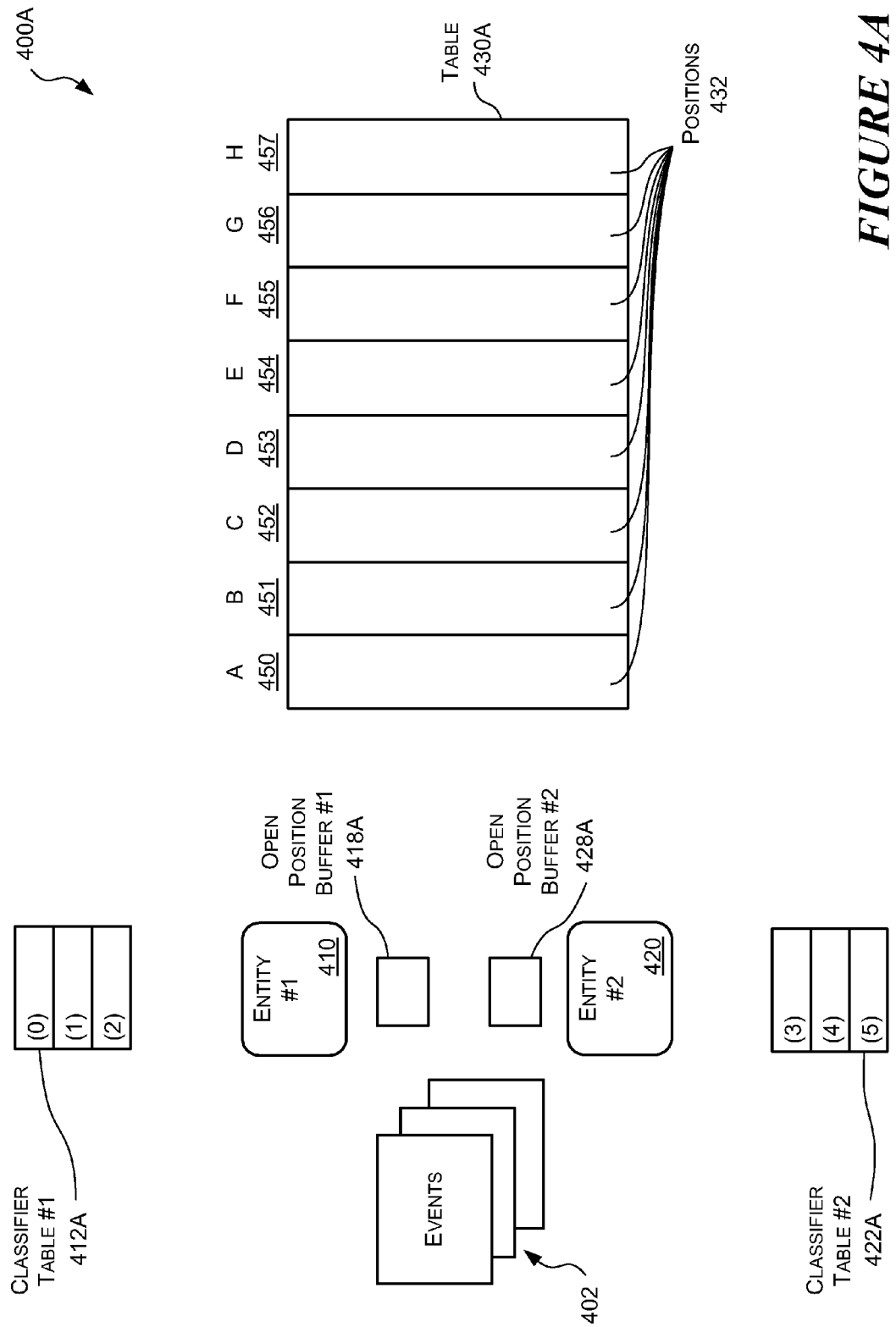
FIGS. 4A-4E, 5A-5B, and 6A-6B are block diagrams of an implementation of classifier tables used by one or more entities to perform lockless atomic updates on portions of a one-dimensional table.

FIG. 4A illustrates an implementation of a table system 400A. The table system 400A may be implemented in the memory of a hardware and/or software-based device to facilitate the management of data packets or other incoming data events 402. The events 402 will be directed by one or more traffic management entities, represented in FIG. 4A by entity #1 410 and entity #2 420. The entities 410 and 420 may be implemented in hardware and/or software, examples of which were illustrated and described above in connection with FIGS. 3A and 3B. In the following examples, the entities 410 and 420 both support control functions in the sense that each can update the table 430A.

In the implementation of FIG. 4A, entity #1 410 is associated with a classifier table #1 412A and an open position buffer #1 418A. Entity #2 420 is associated with a classifier table #2 422A and an open position buffer #2 428A. The classifier tables 412A and 422A and the open position buffers for the separate entities 410 and 420 could be part of the same hardware or memory device. However, logically, the classifier tables 412A and 422A and open position buffers 418A and 428A are depicted as separate because, in one implementation, the entities 410 and 420 can separately and simultaneously update these tables and buffers without the operation of entity #1 410 interfering with that of entity #2 420, and vice versa. Also, while the classifier tables 412A and 422A and open position buffers 418A and 428A are shown as separate from each other and separate from their respective entities 410 and 420, the open position buffers 418A and 428A could be integrated with the classifier tables 41 2A and 422A for the respective entities 410 and 420. In addition, the classifier tables 412A and 422A and/or open position buffers 418A and 428A could be integrated with their respective entities 410 and 420.

As will be described below, each of the entities 410 and 420 manage a mutually disjointed set of classifier indices each of which, in turn, is used to represent one of a set of mutually disjointed positions in the table 430A. The mutually disjointed classifier indices and positions avoid contention in allowing the entities 410 and 420 to separately and simultaneously update portions of the table 430A. The classifier indices are managed through the use of classifier tables 412A and 422A. In implementations of the present disclosure, each classifier index in the classifier table will be associated with a position within the table 430A, as will be described below.

In the example of FIGS. 4A-6B, the classifier tables 412A and 422A each have three positions, thus accommodating three classifier indices to be determined or derived for the incoming data events or packets 402 and to be managed by each of the respective entities. In the implementation of FIG. 4A, the classifier index is determined by position within the classifier tables. The first position in classifier table 412A at position (0) represents the first classifier index, while positions (1) and (2) represent the second and third classifier indices, respectively, managed by entity #1 410. The first position in classifier table 422A at position (3) represents the first classifier index managed by entity #2 420, or the fourth classifier index overall, and is thus labeled as position (3). Positions (4) and (5) represent the second and third classifier indices, managed by entity #2 420, or the fifth and sixth overall classifier indices managed by both entities 410 and 420.

As previously mentioned, each of the entities 410 and 420 also is associated with an open position buffer 418A and 428A, respectively. According to an implementation of the present disclosure, for each of the entities 410 and 420, an open position in the table 430A is maintained that is not simultaneously listed in the classifier tables 412A and 422A. Again, as will be described below, when one of the entities 410 and 420 updates the table 430A, that entity will store the update in its available, open position, then will associate the updated, formerly-open position with the classifier index for the position that was just updated. The position that was just updated then becomes the new open position that will be identified in the respective open position buffer. As a result, the open position for each entity can be atomically updated without locking any of the other positions in the table 430A.

For purposes of the following examples of FIGS. 4B-6B, the table 430A is a one-dimensional table that, in this example, includes a plurality of positions 432. Specifically, the table 430A includes positions in the form of eight columns, including column A 450, column B 451, column C 452, column D 453, column E 454, column F 455, column G 456, and column H 457. The eight positions 432 within table 430A provide four mutually disjointed positions to be managed by each of the entities 410 and 420, including for each entity three positions that will be active and one that will be open for updates.

Figure 4B:
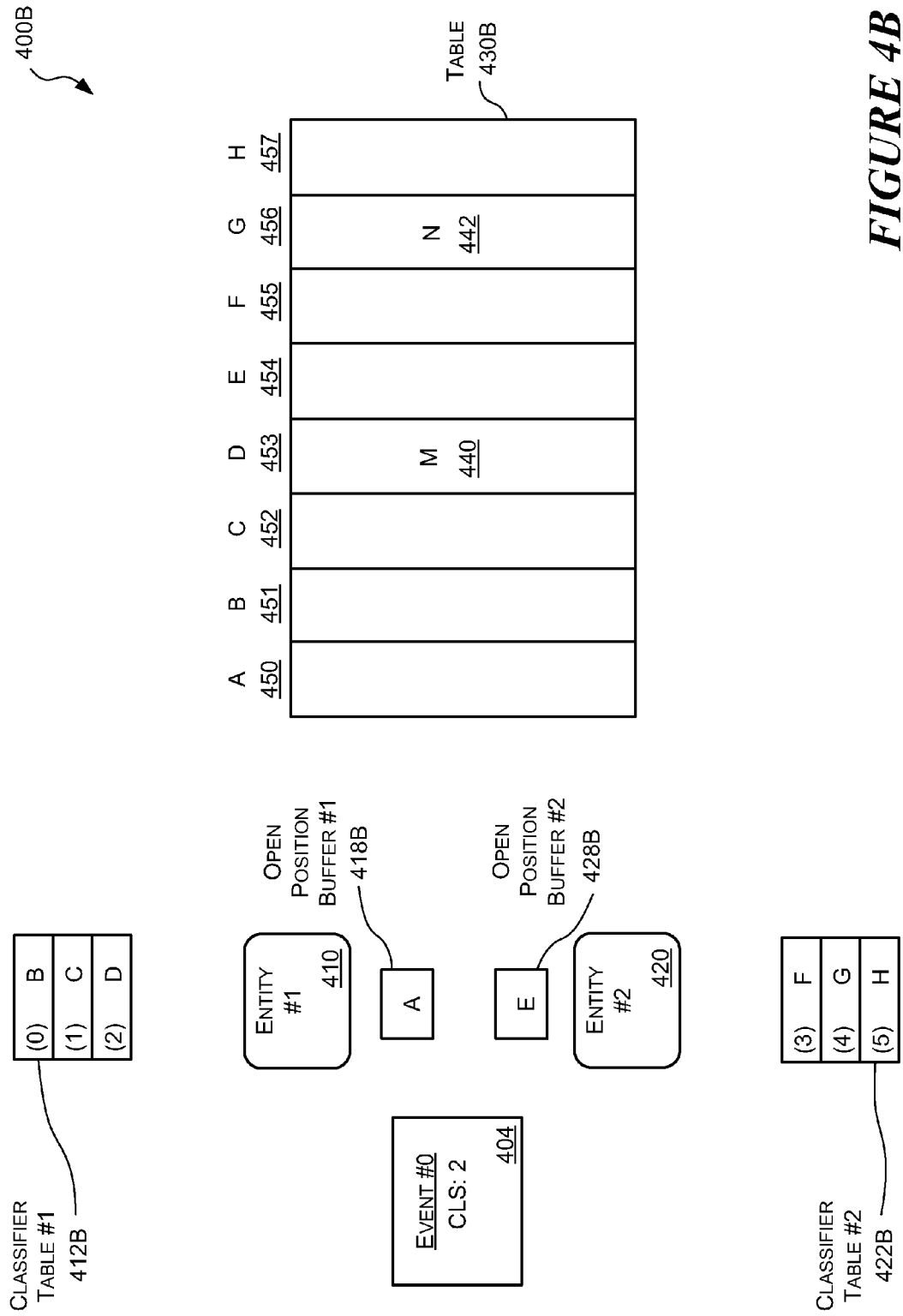

FIG. 4B shows a table system 400B in which the tables and buffers are populated with sample data that will be used in the following examples to illustrate the operation of implementations of the present disclosure. Data event #0 404 is associated with a classifier index 2 that is managed by the first entity. The classifier index associated with each event can be determined or identified in a number of ways. For example, the classifier index may be determined by reading a designated portion of the event, such as a predetermined range of bits in the event. Alternatively, the classifier index may be determined by applying a function, such as a hash function to a portion of the event, the portion including some or all of the event. The output of that function will yield a classifier index. From the resulting classifier index, it is determined which of the entities 410 and 420, each of which manage a mutually disjointed set of classifiers indices, will process the event 404. Because event 404 is associated with classifier index 2, it will be processed by entity #1 410, as described in the following figures.

In the example of FIGS. 4B-6B, the first four positions in the table 430B are associated with entity #1 410, while the last four positions are associated with entity #2 420. This association, however, is arbitrary. Thus, for example, entity #1 410 could have been associated with the last four positions in table 430B, the positions associated with each of the entities 410 and 420 could have been interleaved, etc.

Classifier table #1 412B includes three positions in the table 430B associated with each of the classifier indices. The classifier index (0) is associated with position B, the second classifier index (1) is associated with position C, and the third classifier index (2) is associated with position D. Open position buffer #1 418B is associated with position A 450, the remaining, unused position in the table 430B associated with entity #1 410. Classifier table #2 422B includes three positions in the table 430B associated with each of its classifier indices. Its indices, the overall fourth (4), fifth (5), and sixth (6) indices, are associated with positions F, G, and H, respectively. Open position buffer #2 428B is associated with position E 454, the remaining, unused position in the table 430B associated with entity #2 420. Although the open positions in FIG. 4B are each shown to be the first of the positions associated with each of the entities, this choice also is arbitrary.

The table 430B includes two initial data entries, including M 440 in position D 453, and N 442 in position G 456. These data entries are arbitrary and included only to help illustrate the operation of implementations of the present disclosure FIGS. 4C-6B depict operation of implementations of lockless atomic updating in a one-dimensional table. (FIGS. 7A-8B illustrate operation of implementations of lockless atomic updating in a two-dimensional table.) In these examples, operations to read from or write to one of the tables or buffers are represented by arrows labeled with reference numbers. The following description uses the reference numbers to refer to the operations depicted by the arrows.

Figure 4C:
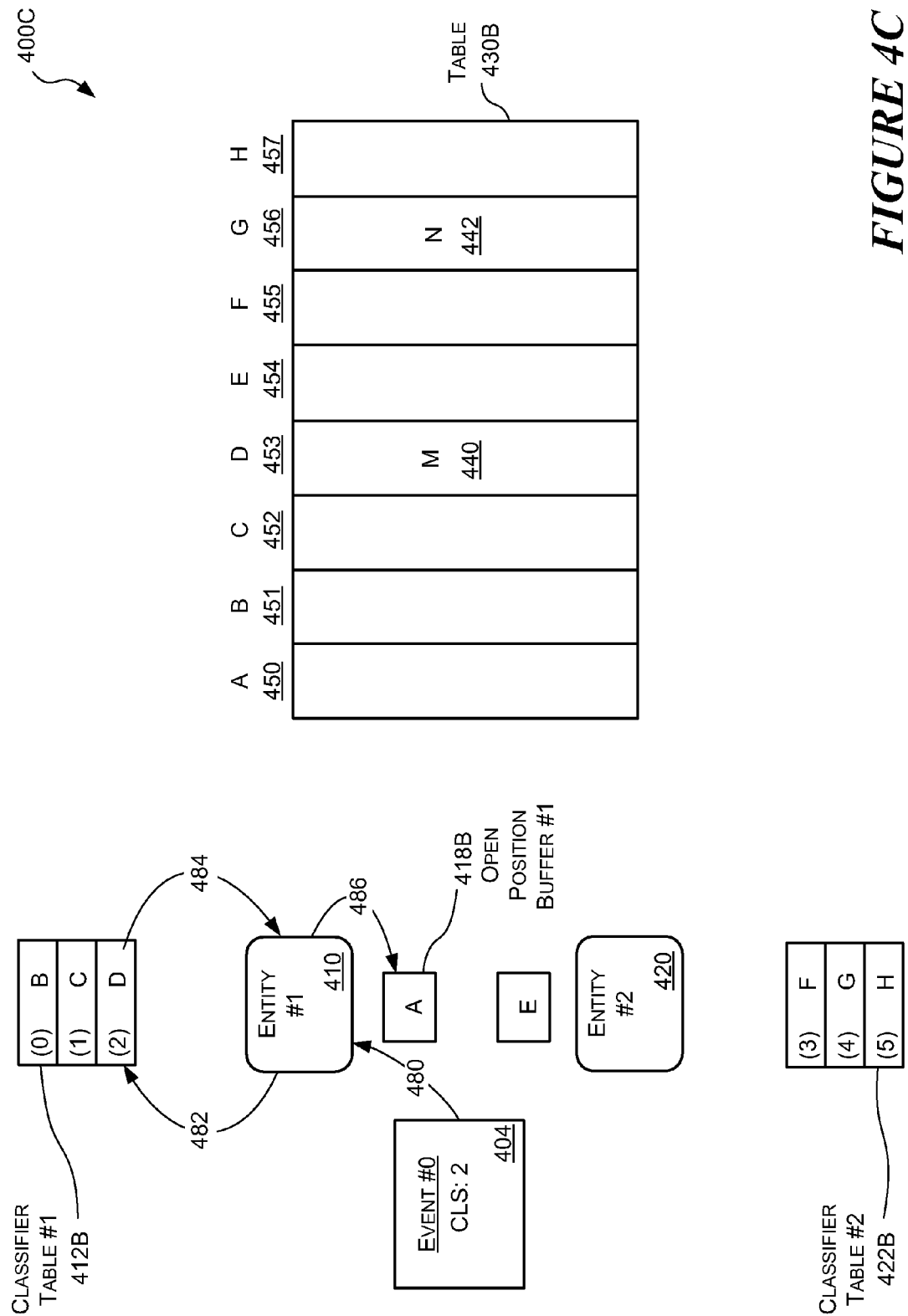

FIG. 4C shows a table system 400C handling the first aspects of processing the data packet or event 404 according to an implementation of the present disclosure. The classifier index associated with the data packet or event #0 404 is determined by reading from the data packet or event 404 or otherwise applying a function to contents of the event 404. The classifier index associated with the data packet or event 404 determines which of the entities will handle the update. The classifier index associated with the data packet or event 404 could be determined by entity #1 410, by another entity, or by other component that would then pass the data packet or event 404 to entity #1 410. The data packet or event 404, event #0, is associated with a classifier index 2 in this example. Because classifier index 2 is one of the classifier indices handled by entity #1 410, the data packet or event 404 is handled by entity #1 410.

At 480, entity #1 410 receives the event 404 and reads that classifier index 2 is associated with the event 404. At 482, entity #1 410 consults classifier table #1 412B to determine what position in the table 430B is associated with the classifier index. At 484, entity #1 410 reads from classifier table #1 412B that classifier index 2 is associated with position D in the table 430B. At 486, entity #1 410 consults open position buffer #1 418B to determine what open position is available to entity #1 410 to apply the update. The open position buffer #1 indicates that position A is the currently open position.

Figure 4D:
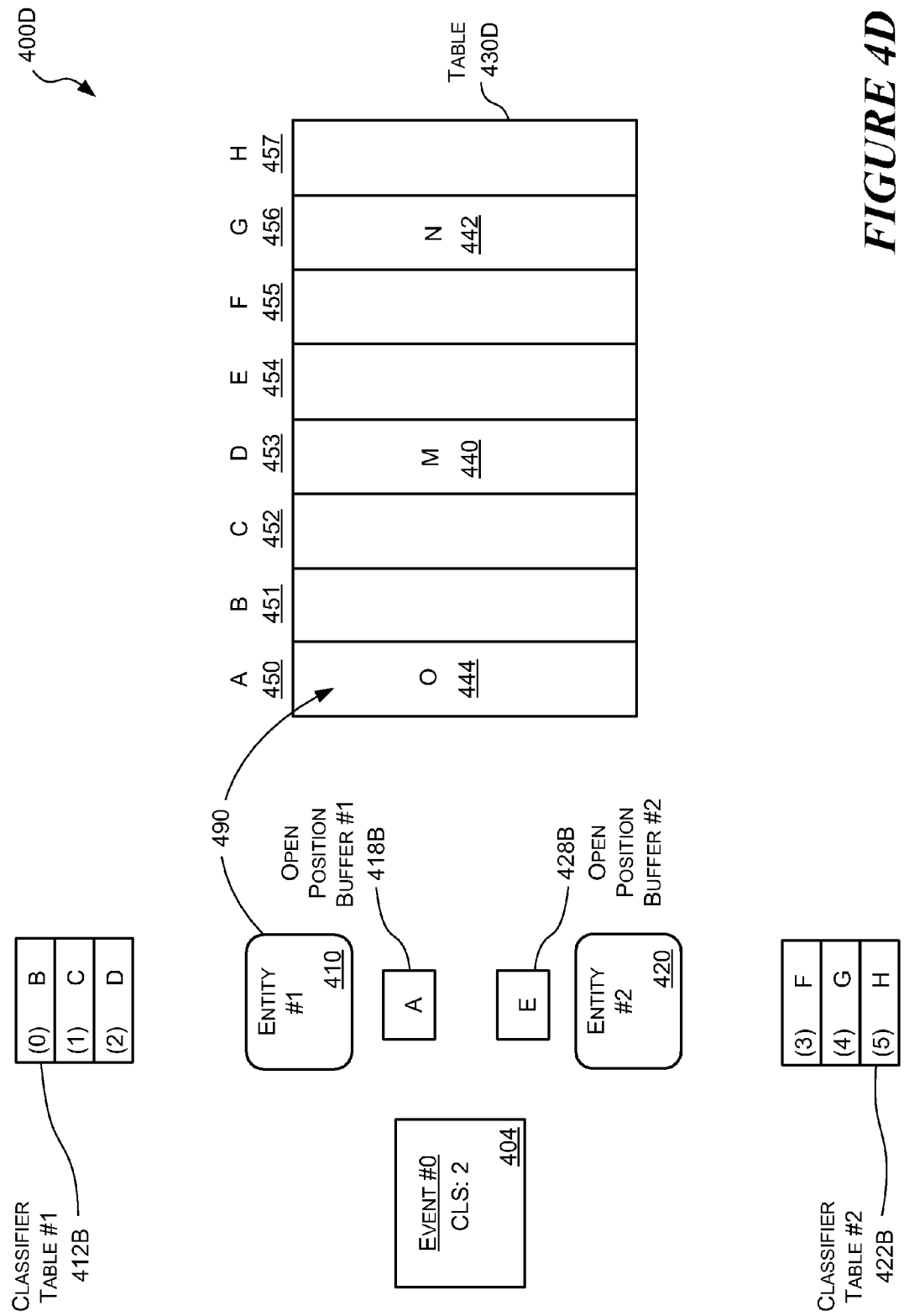

Referring now to FIG. 4D, data packet or event 404 may not currently be associated with a destination in this example. Thus, an update may include storing in the table 430D a destination where subsequent data packets or events 404 associated with the same classifier index may be routed. The destination may be determined as the result of some load-balancing or another process. In this example, the destination or other update applied is O 444.

At 490, the update O 444 is written to position a 450 in the table 430D. Because the event 404 was associated with a classifier index which in turn was associated in classifier table #1 412B with position D, one might conclude that the update would be applied to position D 453 in the table 430D. However, according to an implementation of the present disclosure, when an update is made to the table 430D, the update is applied to the open position available to the entity making the update. Thus, in this case entity #1 410 applies the update to position A 450 which is the open position indicated by open position buffer in #1 418B. Because the update is applied to the open position and not the current position associated with the classifier index, any other entity needing to access information in the current position associated with classifier index can do so; because the update is applied to another position, the current position remains unlocked. Advantages of this lockless update are further described below with reference to FIG. 7C.

Figure 4E:
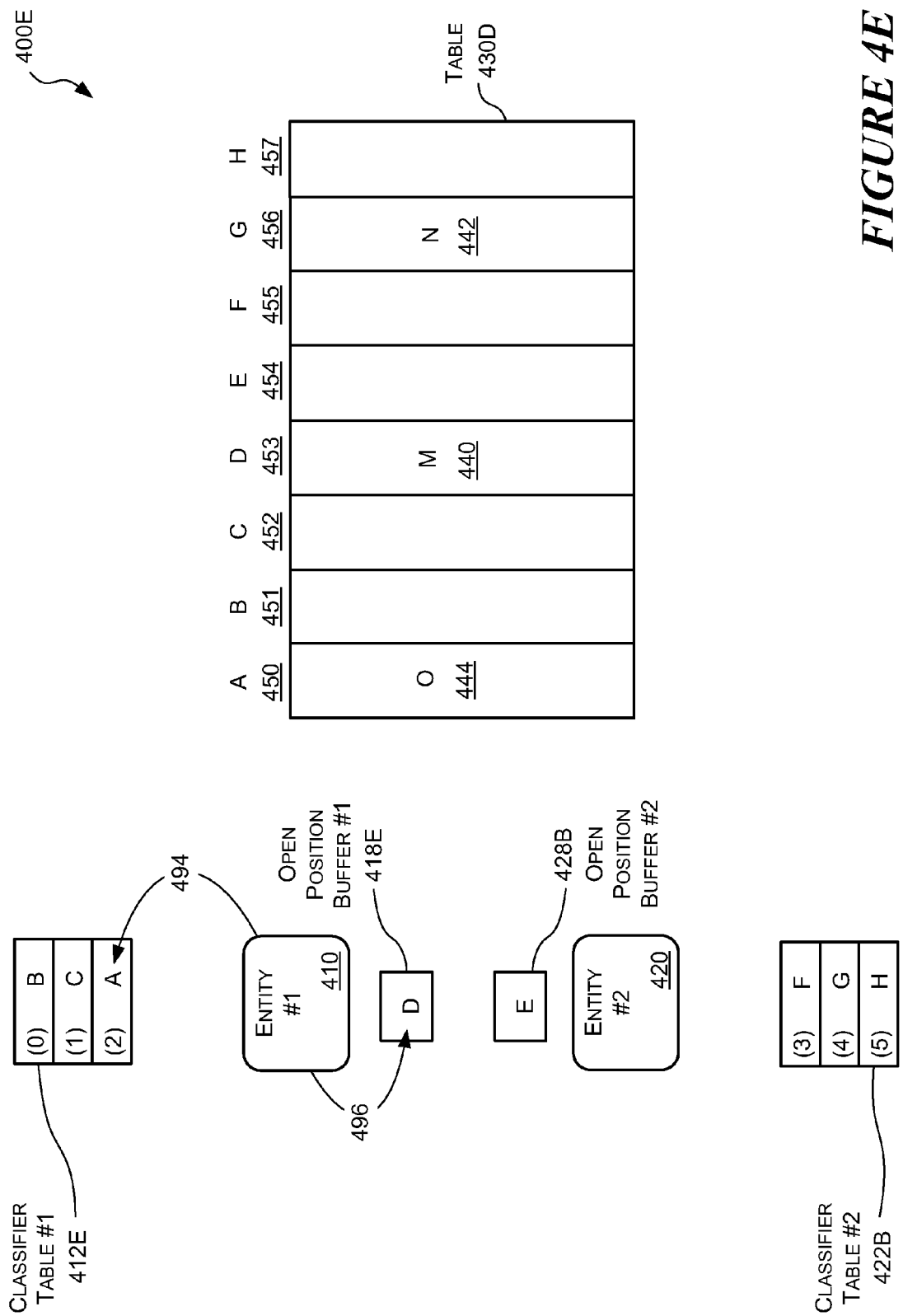

FIG. 4E shows a table system 400E in which the classifier table and open position buffer are themselves updated to reflect the update applied to the table 430D. At 494, entity #1 410 updates classifier table #1 412E to show that classifier index 2 is now associated with position A to reflect the update that was made to position A 450 in table 430D. Now that the update has been applied to the table 430D and reflected in classifier table #1 412E, the position formerly associated with classifier index 2, position D 453, is available as the new open position available to entity #1 410. At 496, open position buffer #1 418E is updated to reflect that position D 453 is now the open position. With the tables and the open position buffer updated, the table system 400E is now fully updated and ready to continue processing the data packet(s) or event(s).

Figure 5A:
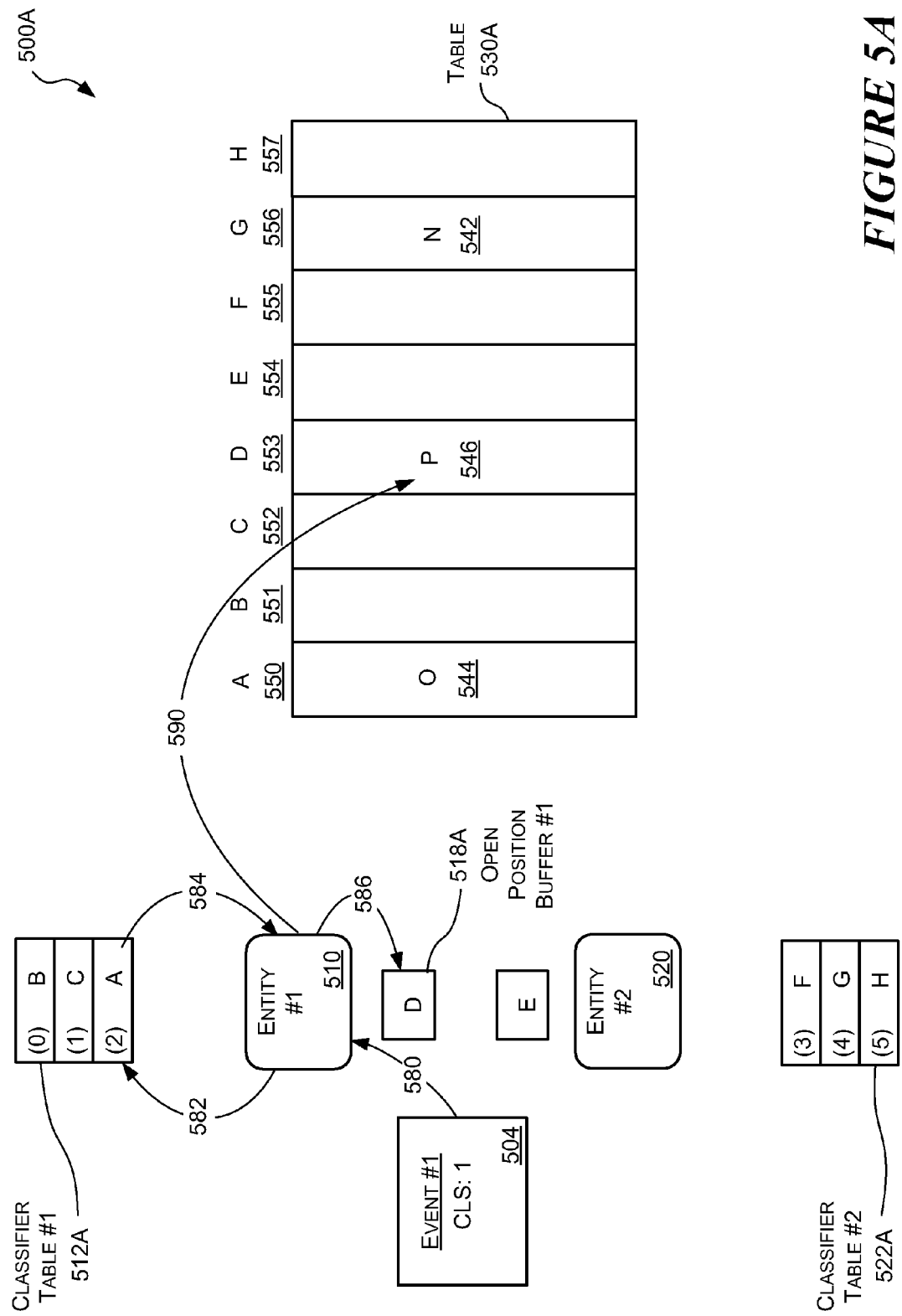
Figure 5B:
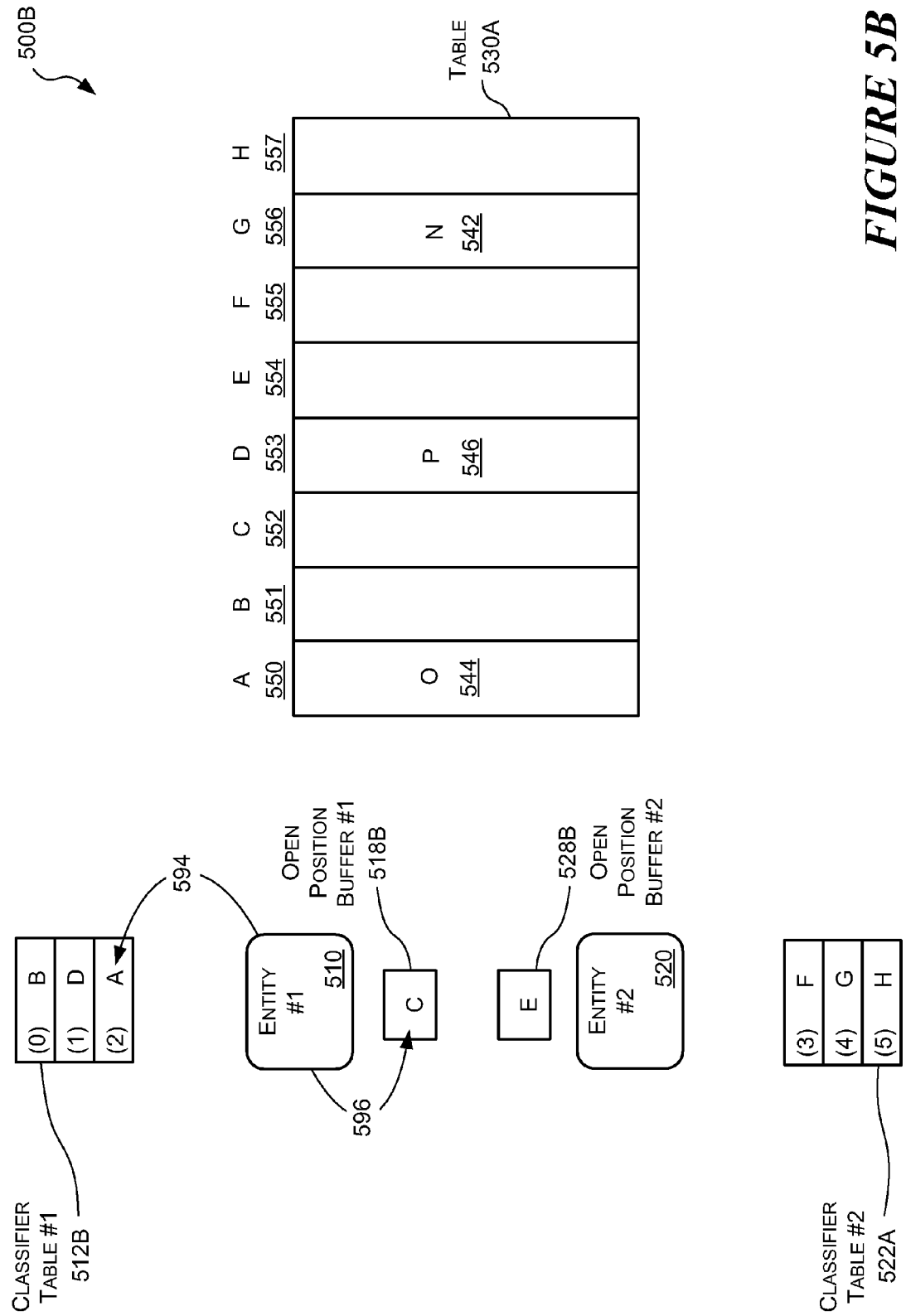

FIGS. 5A and 5B depict the processing of a next data packet or event to further illustrate the operation of an implementation of lockless atomic updating. The views of FIGS. 4B-4E are condensed into FIGS. 5A-5B in the interest of conciseness.

FIG. 5A shows table system 500A, that begins with the state of table system 400E. In FIG. 5A, a next data packet or event, event #1 504, is processed according to an implementation of the present disclosure. At 580, entity #1 510 receives event #1 504 and determines that event #1 504 is associated with classifier index 1. At 582, entity #1 510 refers to classifier table #1 512A. At 584, entity #1 determines that classifier index 1 is currently associated with position C. At 586, entity #1 510 reads from open position buffer #1 518A that the current open position is position D. Thus, at 590, instead of writing the update, P 546, to position C associated with classifier index 1, the update is written to the currently open position, position D 553. As a result, any other components or entities that might desire to read from position C 552 will be able to do so because entity #1 510 writes the update to the open position, position D 553.

FIG. 5B shows table system 500B, in which the relevant classifier table and open position buffer are updated to reflect the update made to the table 530A. At 594, classifier table #1 512B is updated to reflect that classifier index 1 is now associated with position D, the previously open position in which the update was applied to the table 530A. At 596, open position buffer #1 518B is updated to reflect that the new open position is position C, the position that was replaced in the previous update.

Figure 6A:
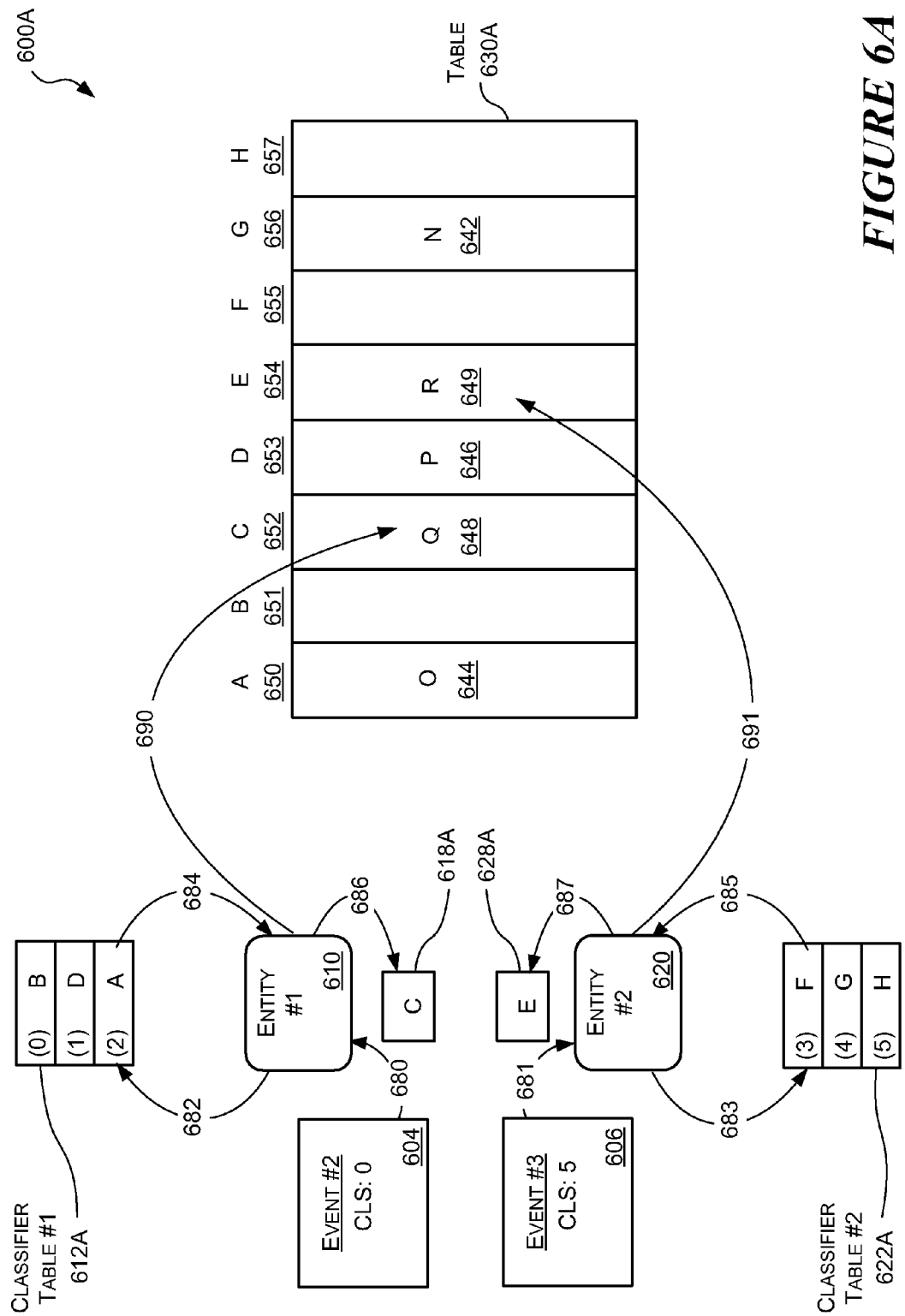
Figure 6B:
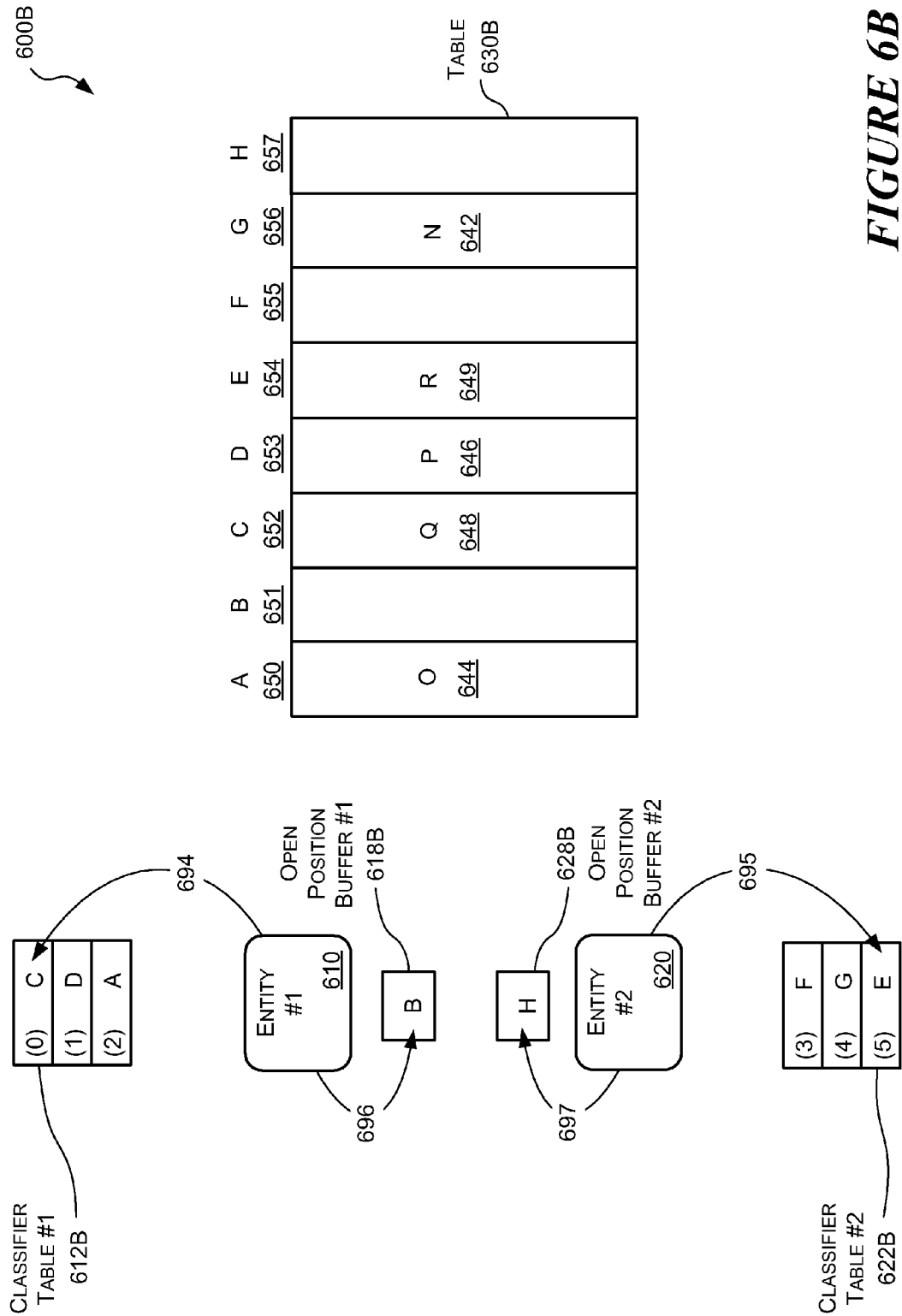

FIGS. 6A and 6B depict one further example of updates to a single-dimension table to illustrate updates being made by multiple entities. FIG. 6A shows a table system 600A receiving event #2 604 associated with classifier index 0, which is associated with entity #1 610, and event #3 606 associated with classifier index 5, which is associated with entity #2 620. To distinguish between the actions of each of the entities 610 and 620, actions associated with entity #1 610 continue to be referenced with even reference numbers, while the actions associated with entity #2 are referenced with odd reference numbers.

At 680, entity #1 610 receives event #2 604 and determines that event #2 604 is associated with classifier index 0. At 682, entity #1 610 refers to classifier table #1 612A. At 684, entity #1 determines that classifier index 0 is currently associated with position B. At 686, entity #1 610 reads from open position buffer #1 618A that the current open position is position C. Thus, at 690, instead of writing the update, Q 648, to position B 651 associated with classifier index 0, the update is written to the currently open position, position C 652. During this time, however, any other components or entities that might desire to read from position B 651 will be able to do so because entity #1 610 atomically writes the update to the open position, position C 652, ensuring that position B 651 remains unlocked and available.

While entity #1 610 applies the update motivated by event #2 604, entity #2 620 may simultaneously or nearly simultaneously apply an update triggered by event #3 606. At 681, entity #2 620 receives event #3 606 and determines that event #3 606 is associated with classifier index 5. At 683, entity #2 620 consults classifier table #2 622A. At 685, entity #2 620 determines that classifier index 5 is currently associated with position H. At 687, entity #2 620 determines from open position buffer #2 628A that the current open position available to entity #2 620 is position E. Thus, at 691, instead of writing the update, R 649, to position H 657 associated with classifier index 5, entity #2 620 applies the update to the currently open position for entity #2 620, position E 654. Again, while this update is applied, other components or entities that have reason to access position H 657 are able to do so; entity #2 620 atomically writes the update to its open position in table 630B, position E 654, leaving position H 657 unlocked and accessible.

Again, while updates are being applied by entity #1 610 and entity #2 620, other components or entities may need to access the table 630B. For example, the values written to the table, from O 644 to R 649, may have information, all or portions of which, provide a destination for a data packet received by the traffic management device table system 600A. Thus, if entity #2 620 seeks to find a destination for a packet or event that is already associated with a destination, it may read destination information stored in the data at position B 651 that is not related to or hindered by the update being applied by entity #1 610. Implementations of lockless atomic updating allow for entities 610 and 620, which may be control components configured to assign destinations to previously unassociated packets or events, to update the table 630A while switching components have full access to the table 630A to direct previously associated events or packets.

FIG. 6B shows table system 600B, in which the classifier tables 612B and 622B and open position buffers 618B and 628B are updated to reflect the update made to the table 630A. At 694, entity #1 610 updates classifier table #1 612B to reflect that classifier index 0 is now associated with position C 652, the previously open position in which the update was applied to the table 630A. At 696, entity #1 610 updates open position buffer #1 618B to indicate that the new open position available to entity #1 610 for its next update is position B, the position that was superseded in the previous update.

While entity #1 610 updates classifier table #1 612B and open position buffer #1 618B, perhaps simultaneously, entity #2 620 updates classifier table #2 622B and open position buffer #2 628B to reflect the update entity #2 620 just applied to the table 630B. At 695, entity #2 620 updates classifier table #2 622B to indicate that classifier index 5 is now associated with position E 654, the previously open position prior to the update. At 697, entity #2 620 updates open position buffer #2 628B to reflect that the open position now available to entity #2 620 is position H.

Examples of Lockless Atomic Table Updating: Two-Dimensional Table

FIGS. 7A-8B illustrate examples of implementations of lockless atomic updating in the context of a two-dimensional table. Implementations of lockless atomic updating may be applied to tables or other data stores of any dimension. Also, as described below, the indirection in accessing the table facilitated by the classifier tables may be used in more than one dimension to allow atomic updating to be applied in multiple dimensions if the supporting system allows such granularity of access.

The two-dimensional examples lend themselves to illustration of how routing of packets and data events is commonly handled: information regarding the routing of packets/events commonly is stored in a two-dimensional table, and the information needed to route a particular packet/event may be found in a cell in a particular column at a particular row. The column and row address of a particular cell can be read from the packet/event or can be derived from the packet/event by applying a hash function to some or all of the data content of the packet/event.

Using an implementation of lockless atomic updating, a selected column may be updated to reflect, for example, the association of a destination with a previously unassociated packet/event. As explained below, the update is applied by copying the contents of the current column to the open column and then updating the row of that open column to include the new association information. While the update is being applied in a currently open column, switching components seeking to route packets/events already associated with destinations are able to access other rows of the current column, at its current position. Thus, while the update is being atomically applied to the data from the current column in another (i.e., open) position in the table, the existing information in the current column remains unlocked for access. Because that column remains unlocked, components may access that information to route packets or events without delay and without dropping packets. Once the update is complete, the classifier table or tables are updated, and components seeking to route events associated with that classifier index are then directed to the updated column in the table. Thus, components seeking to route events already associated with destinations, including events newly associated in the most recent update, can obtain the desired routing information from the updated column.

FIGS. 7A-8B illustrate table systems using a somewhat different implementation than that illustrated in FIGS. 4A-6B. As already noted, the tables are two-dimensional tables. Moreover, instead of using separate open position buffers, the classifier tables include a location to identify the positions in the tables currently open for the entities to apply updates. Also, unlike the classifier tables in the previous examples that were presented in the form of a one-dimensional array, the classifier tables in the following examples are presented as two-dimensional tables to associate a classifier index with a position in the table. As previously mentioned, the classifier tables also could be integrated within their respective entities, although that variation is not shown in FIGS. 7A-8B. In any case, the preceding and following examples are provided for illustration, not limitation, and implementations according to the present disclosure are not limited by details provided by way of illustration.

FIG. 7A shows a table system 700A configured to allow entities 710 and 720 to process a series of data packets or other events 702 to update a two-dimensional table 730A. Entity #1 710 is associated with classifier table #712A, which has a number of classifier indices 714 that can be associated with positions of the table 730A in positions in a first dimension 732 of the table 730A. The positions in the first dimension 732 are columns including column C0 750, column C1 751, column C2 752, column C3 753, C4 754, column C5 755, column C6 756, column C7 757 of the table 730A. The table 730A also includes in a second dimension 734 a plurality of rows, including row R0 770, row R1 771, row R2 772, row R3 773, and row R4 774.

Entity #1 710 is associated with classifier table #1 712A and entity #2 720 is associated with classifier table #2 722A. As previously described, classifier tables 712A and 722A each include a location to identify the current open positions in the table associated with each of the entities to apply updates. In implementations according to the present disclosure, each of the entities is individually associated with an open position available for its use. Although a pool of open positions could be made available to be used collectively by the entities, this would create the possibility of contention between entities for the same open position. As a result, the pool of open positions would have to employ a locking system for the open positions would involve the complexity of a locking system and the possibility of delays that implementations of lockless atomic updating seek to avoid.

Entity #1 710 is associated with classifier indices A, B, and C and manages columns C0 750-C3 753, while entity #2 720 is associated with classifier indices D, E, and F and manages columns C4 754-C7 757. As previously described, implementations according to the present disclosure associated mutually disjoint sets of classifier indices and positions with each of the entities to avoid contention and to support lockless updating.

In the examples of FIGS. 7A-8B, first and second classifier indices associated with each of the events 702 are determined by reading a portion of each of the events or by deriving the classifier indices by applying one or more functions, such as hash functions, to the contents of the events 702. In these examples, first classifier indices will be associated with columns in the first dimension 732 of the table 730A while second classifier indices will be associated with rows in the second dimension 734 of the table 730A. The following examples show that an open position in the first dimension 732 is used atomically to apply updates to single columns, while the second classifier index is used to access locations within the columns. Alternatively, however, the updates could be applied in open rows instead of open columns. In other alternatives, classifier tables could be made available in multiple dimensions to allow atomic updating of individual cells.

Figure 7B:
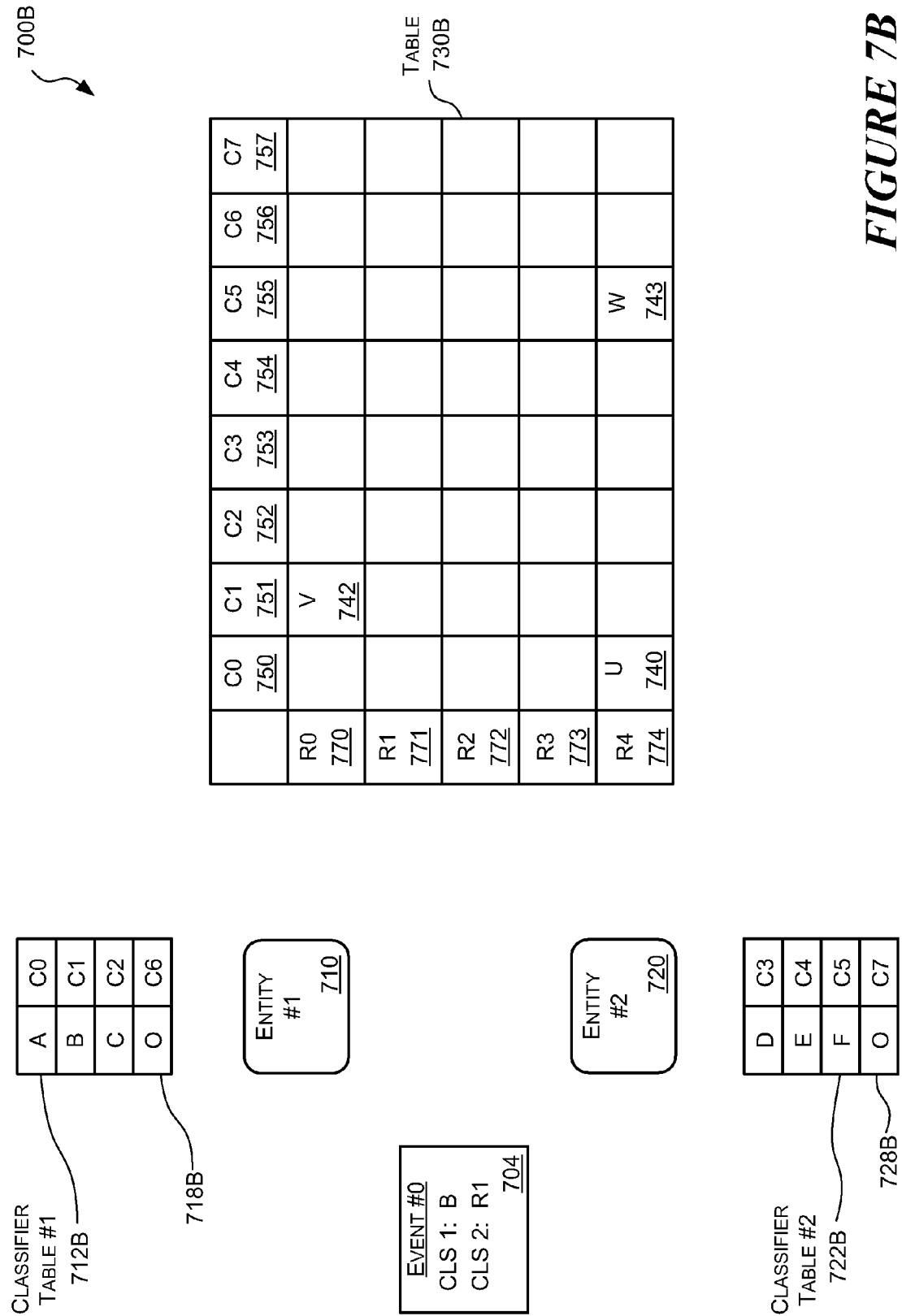

FIG. 7B shows a table system 700B in which the tables are populated with sample data that will be used in the following examples to illustrate the operation of implementations of the present disclosure. Data event #0 704 is associated with a first classifier index B that is managed by entity #1 710. Data event #0 also is associated with a second classifier index that corresponds with R1. In the examples of FIGS. 7A-8B, classifier tables are used in only one dimension, the first dimension 732 (FIG. 7A), so the second classifier indices identify a location in the table 730B rather than a classifier index associated with a position through the use of a classifier table. Classifier table #1 712B currently associates classifier index A with position C0, classifier index B with position C1, and classifier index C with position C2. The table 730B includes three initial data entries, including U 740, V 742, and W 743. These data entries are arbitrary and included only to help illustrate the operation of implementations of the present disclosure.

Figure 7C:
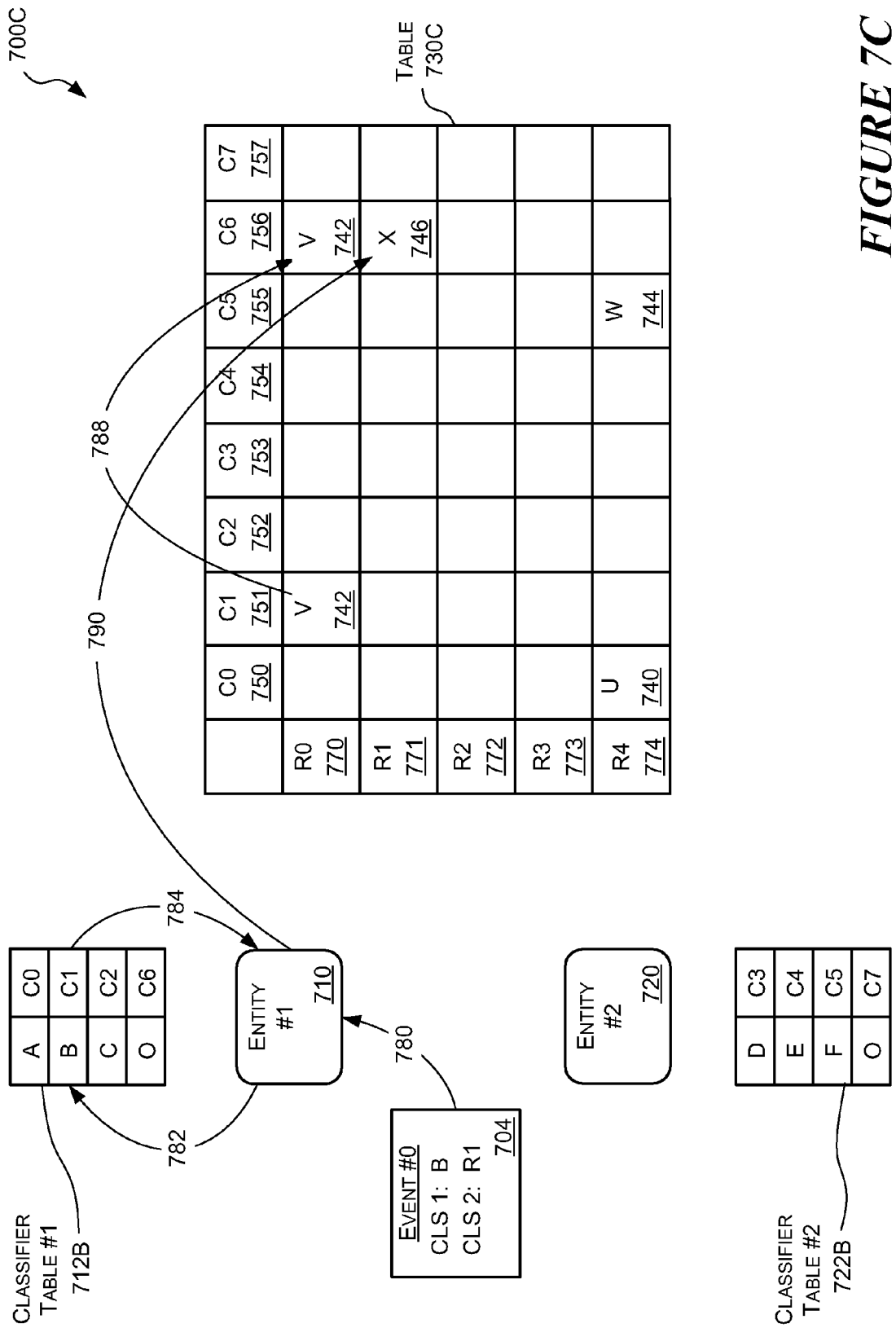

FIG. 7C shows a table system 700C handling the first aspects of processing the data packet or event 704 according to an implementation of the present disclosure. At 780, entity #1 710 receives the event 704 and reads that the first classifier index is classifier index B and the second classifier index is R1. At 782, entity #1 710 consults classifier table #1 712B to determine what position currently is associated with classifier index B and to determine what is the currently open position available to it to apply an update. At 784, from classifier table #1 712B, entity #1 determines that classifier index B is associated with column C1 and that column C6 is the current open position.

In an implementation of lockless atomic updating in a multi-dimensional table as shown in FIG. 7C, locations in the position identified by the classifier index of the event being processed are first copied to respective locations in the open position. In updating the table 730C in response to event #0 704, only one or some of the row locations in the position currently associated with the classifier index may be updated. However, after the update is made available upon updating the classifier tables as previously described, the information that was not updated should continue be made available in the table.

Thus, at 788, information stored in the rows of the position currently associated with the classifier index of event #0 704, which in this case is column C1 751, is copied to the open position column, column C6 756. For example, data V 742, in row R0 770 of column C1 751, is copied to a corresponding row location in row R0 770 of column C6 756. At 790, the updated data, X 746, is then stored in the open position column C6 756 in row R1 771, as specified by the second classifier index of event #0 704. As a result, column C6 756 in the current open position now includes the data not being updated from the current position, V 742, and the updated data, X 746.

Figure 7D:
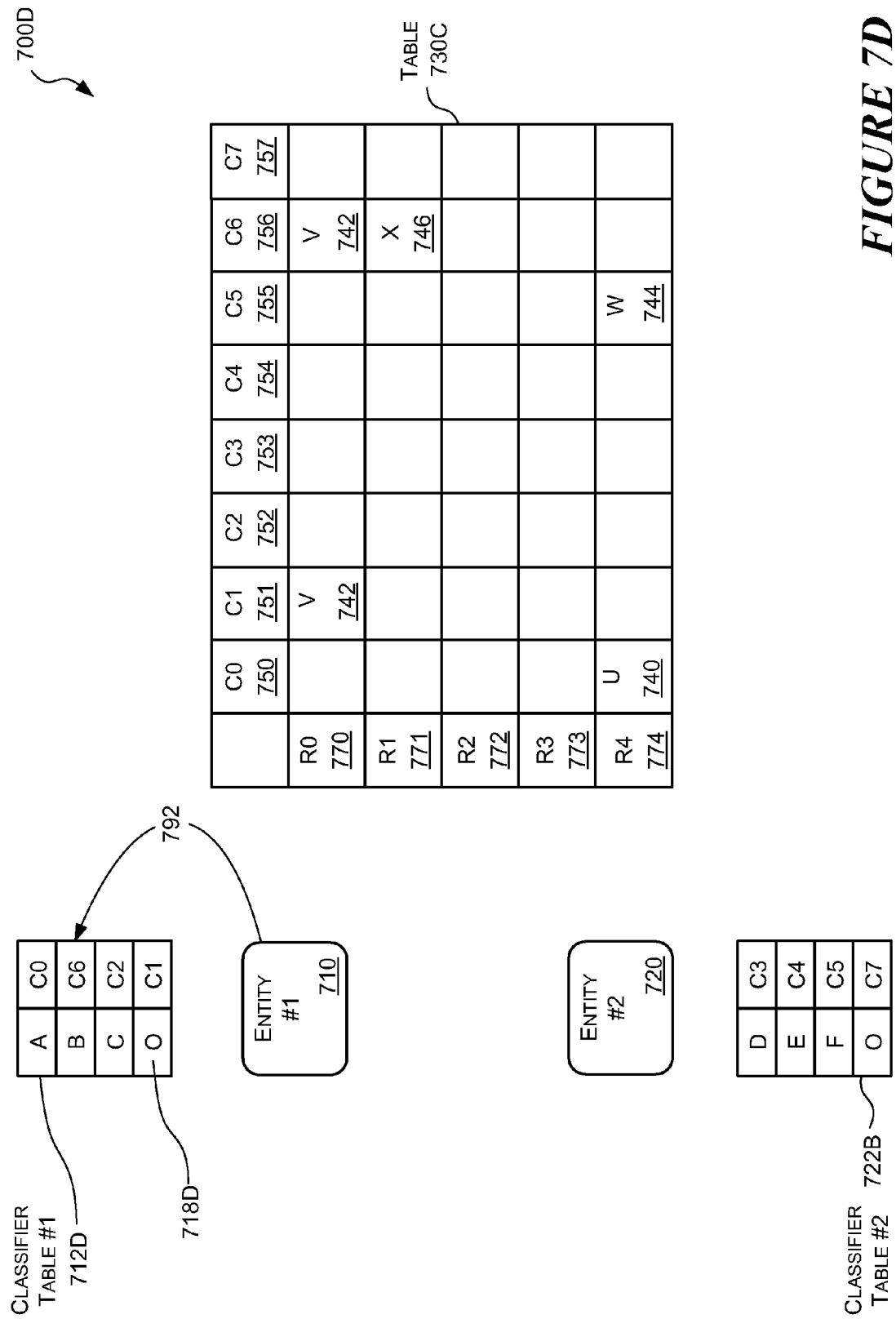

FIG. 7D shows a table system 700D in which entity #1 710 updates classifier table #1 712D reflect the update applied to the table 730C. At 792, the updates are applied to show that classifier index B is now associated with column C6 756 to reflect the update that was made in column C6 of the table 730C. In addition, the open position space 718D in classifier table #1 712D is updated to show that column C1 is now the open position available to receive the next update.

Figure 8A:
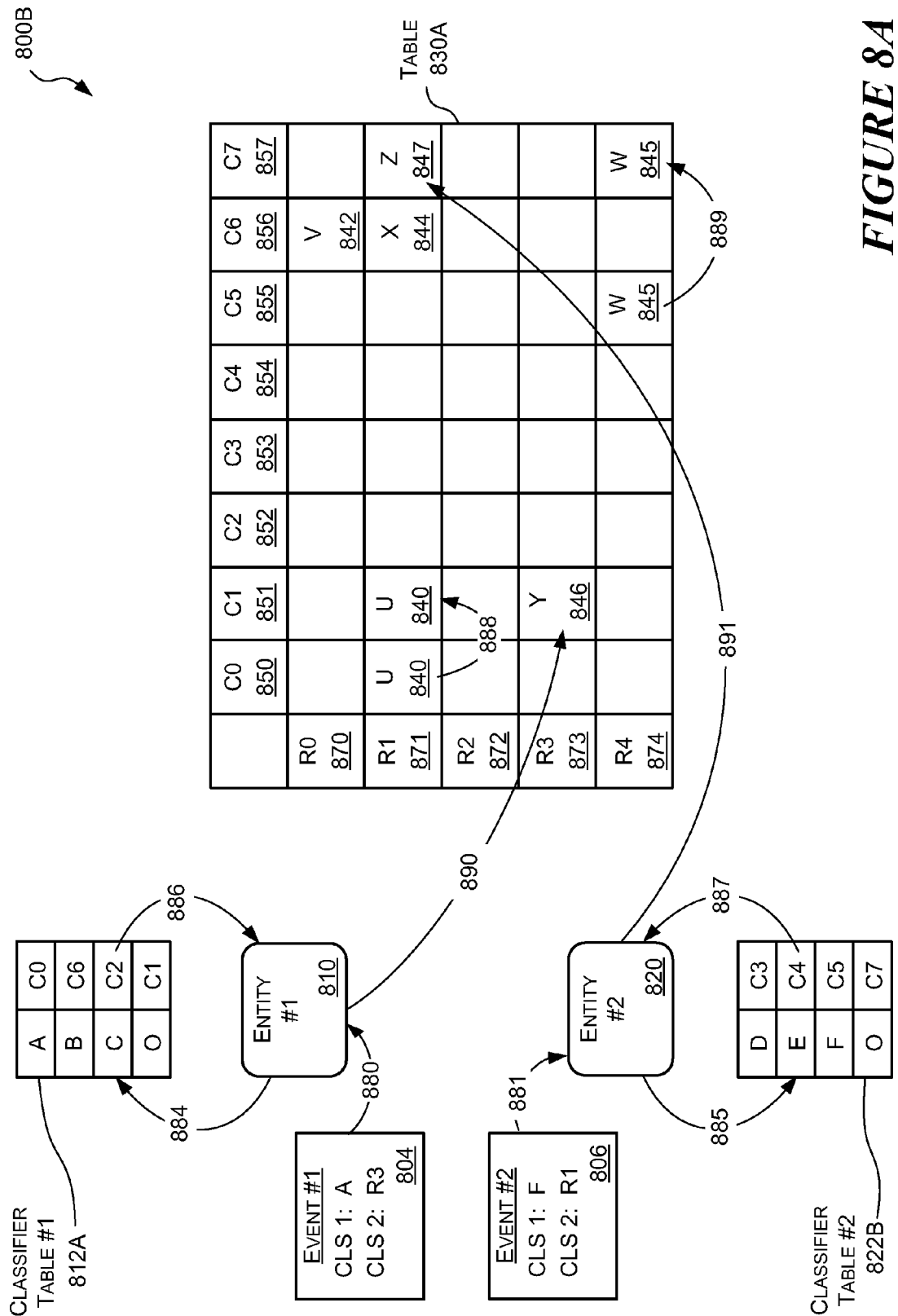
Figure 8B:
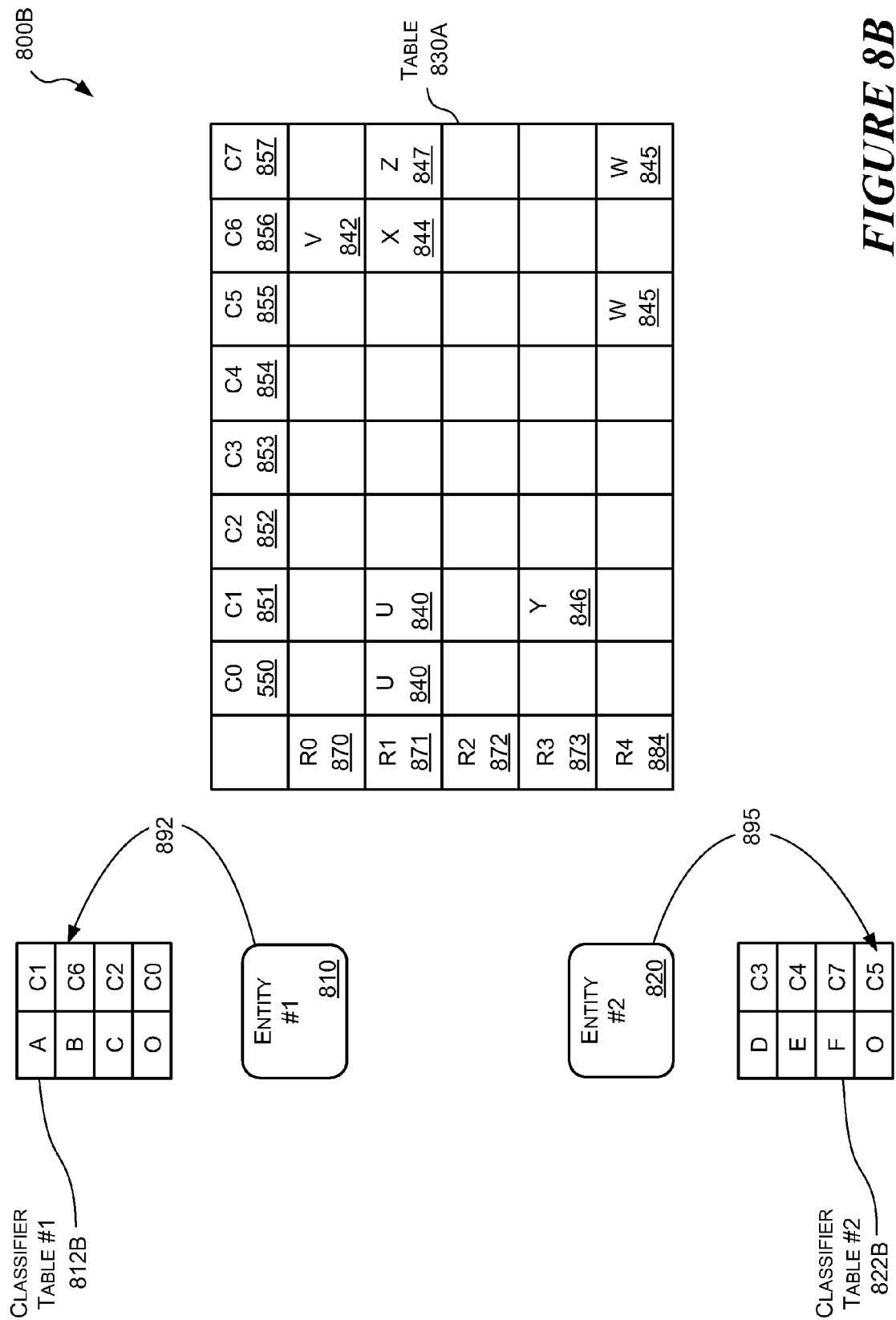

FIGS. 8A-8B illustrate an example in which more than one entity simultaneously or nearly simultaneously update the table 830A. Entity #1 810 and Entity #2 820 are associated with respective classifier tables 812A and 822A and manage designated classifier indices and positions in the table 830A as described with reference to FIGS. 7A-7D. The table 830A includes a plurality of columns C0 850 through C7 857 and a plurality of rows R0 870 through R4 874.

At 880, entity #1 810 receives event #1 804 and determines that it is associated with a first classifier index A and a second classifier index R3. At 884, entity #1 810 refers to classifier table #1 812A to determine what position in the table 830A is currently associated with classifier index A and what is the current open position. At 886, entity #1 810 determines that classifier index A is currently associated with column C0 and that the current open position is column C1. At 888, any data populating column C0 850, that is currently associated with the first classifier index A, is copied to the corresponding row in the open position column C1 851. At 890, new data associated with event #1 804, in the form of Y 846, is written to row R3 873, as indicated by the second classifier index, in column C1 851.

At or about the same time, at 881, entity #2 820 receives event #2 806 and determines that it is associated with a first classifier index F and a second classifier index R1. At 885, entity #2 820 refers to classifier table #2 822A to determine what position in the table 830A is currently associated with classifier index F and what is the current open position. At 887, entity #2 820 determines that classifier index F is currently associated with column C5 and that the current open position available for entity #2 820 is column C7. At 889, data populating column C5 856 is copied to the corresponding row in the open position column C7 857. At 891, new data associated with event #2 806, in the form of Z 847, is written to row R1 873, as indicated by the second classifier index of event #2 806, in column C7 857.

FIG. 8B shows table system 800B, in which the entities 810 and 820 update classifier tables 812B and 822B, respectively, to reflect the updates made to the table 830A. At 892, entity #1 810 updates classifier table #1 812B to reflect that classifier index A is now associated with position C1 and the open position is now C0. At 893, entity #2 820 updates classifier table #2 822B to reflect that classifier index F is now associated with position C7 and the open position available for entity #2 820 is now C5.

Exemplary Modes of Lockless Atomic Updating

Figure 9:
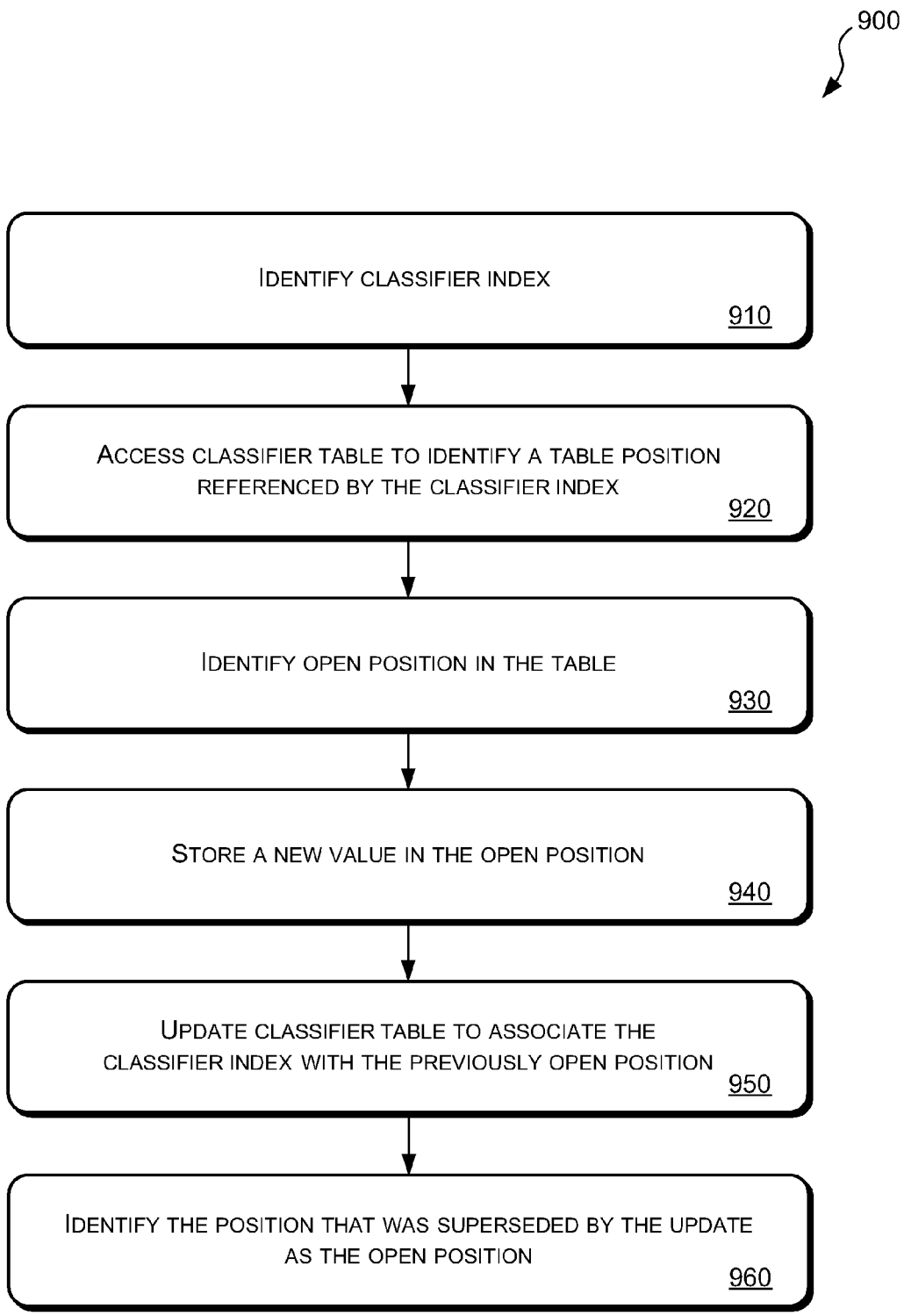
FIGS. 9 and 10 are flow diagrams of processes for performing lockless atomic updates of tables.
Figure 10:
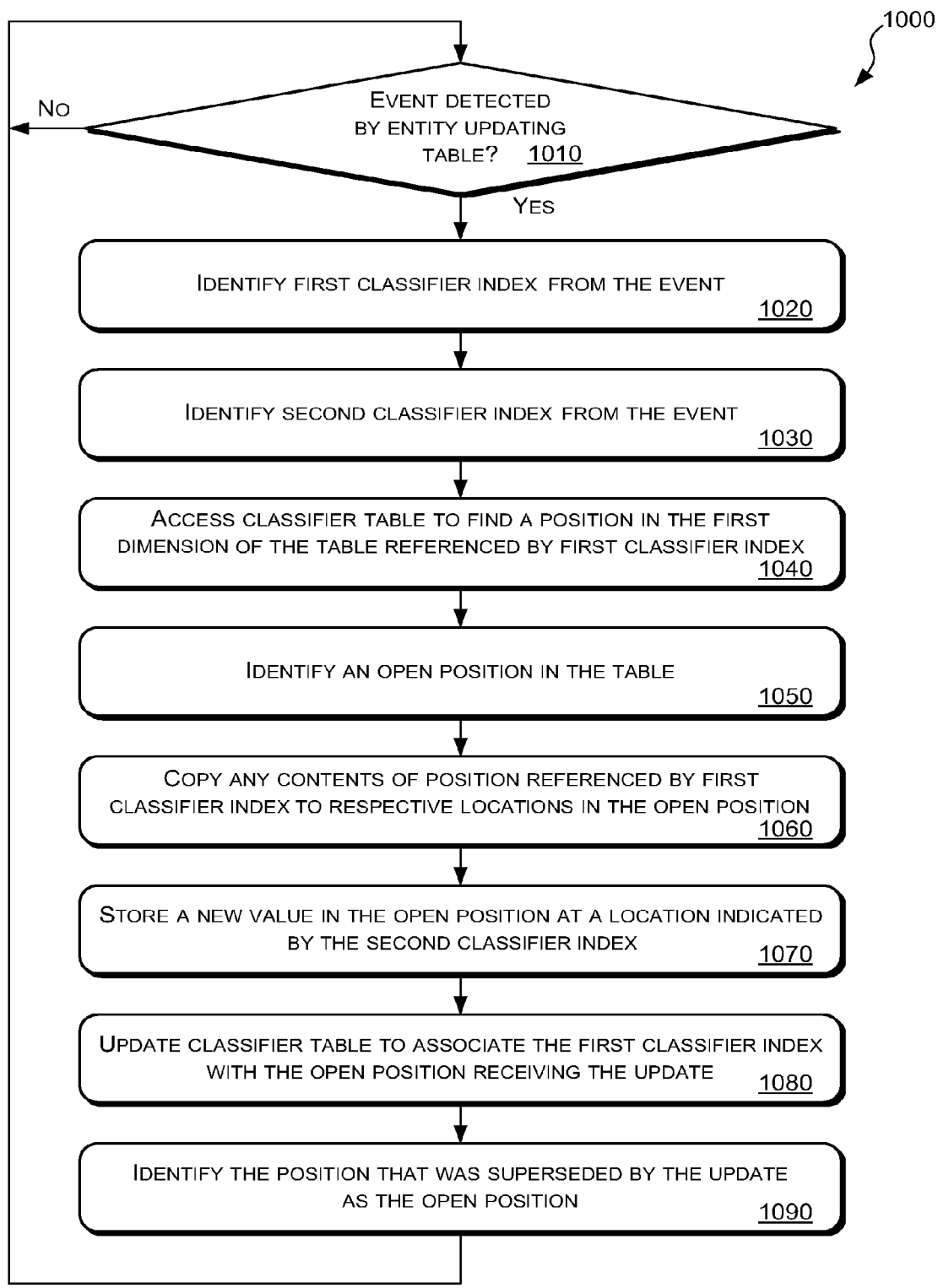

FIGS. 9 and 10 illustrate modes of updating single-dimension and two-dimension tables, respectively, according to implementations of the current disclosure. As previously described, implementations according to the present disclosure can be used to update tables more than two dimensions. In addition, classifier tables could be used to apply and control updates in more than one dimension of a table to allow lockless atomic updating at a cell level, rather than just at a column or row level.

FIG. 9 presents a flow diagram 900 illustrating one mode of updating a one-dimension table. At 910, a classifier is identified for a data event or packet initiating an update to the table. At 920, a classifier table is accessed to identify a table position associated with or referenced by the classifier index. At 930, an open position in the table available to receive the update is identified. At 940, a new value is stored in the open position. As exemplified in FIGS. 4A-6B, a new value may be stored in the open position without copying data stored in the position being updated, but the new value also may include some data that is copied from the position being updated.

At 950, the classifier table is updated to associate the classifier index with the previously open position. At 960, to facilitate the next update, the referenced position whose contents were superseded in the update is now identified as the open position available to receive the next update. The process illustrated by the flow diagram 900 may be repeated, updating positions referenced by the classifier index determined from the data event or packet, storing the updates in the open position, and then making the superseded position available for the next update. As the updates are being made, the position referenced by the classifier index remains unlocked and available for access.

FIG. 10 presents a flow diagram 1000 illustrating a mode of updating a two-dimensional table. The process of flow diagram 1000 varies from that of the flow diagram 900 (FIG. 9) to reinforce that the modes presented in this description are provided by way of illustration, not limitation.

At 1010, an event, such as a data packet or other data event, is detected by an entity configured to apply updates to the table. At 1020, a first classifier index is identified from the event. At 1030, a second classifier index is identified from the event. As previously described, each of the classifier indices may be read from or derived from the content of the event. At 1040, a classifier table is accessed to determine the position in the first dimension of the table corresponding with the first classifier index. At 1050, an open position available to the entity to update the table is identified. As previously described, the update will be applied in the open position.

At 1060, any existing contents of the position referenced by the first classifier index are copied to corresponding rows or other locations in the open position. At 1070, a new value indicated by or for the data event or packet is stored in the open position at a position indicated by the second classifier index. At 1080, the classifier table is updated to associate the first classifier index with the open position that has received the update. At 1090, the position that previously was referenced by the first classifier index is now identified as the open position to receive the next update.

CONCLUSION

Although exemplary implementations have been described in language specific to structural features and/or methodological acts, it is to be understood that the appended claims are not necessarily limited to the specific features or acts previously described. Rather, the specific features and acts are disclosed as exemplary implementations.

The invention claimed is:

1. A method to provide uninterrupted access to a network traffic handling table during table updates, the method comprising:
   identifying a first classifier index associated with a data packet received by one of a plurality of traffic management devices;
   determining from a first classifier table an initial table position in a first dimension of the network traffic handling table, the classifier table associating classifier indices with table positions such that the initial table position is associated with the first classifier index;
   determining an initial open table position in the first dimension of the network traffic handling table;
   storing information associated with the data packet in the initial open table position in the network traffic handling table; and
   associating the initial open table position with the first classifier index in the first classifier table.

2. The method of claim 1, further comprising designating the initial table position previously associated with the first classifier index as an updated open position for the network traffic handling table.

3. The method of claim 2, further comprising maintaining an indication of the updated open position in the network traffic handling table.

4. The method of claim 1, further comprising:
   identifying a second classifier index associated with the data packet;
   determining a second initial table position in the network traffic handling table in a second dimension of the network traffic handling table such that the second initial table position is associated with the second classifier index; and
   upon storing the information associated with the data packet in the initial open position in the network traffic handling table, storing the information associated with the data packet at the second initial table position of the second dimension in the initial open position in the network traffic handling table.

5. The method of claim 4, wherein the first dimension of the network traffic handling table includes a plurality of columns and the second dimension of the network traffic handling table includes a plurality of rows.

6. The method of claim 4, further comprising, before storing the information associated with the data packet within the initial open position in the network traffic handling table, copying existing data from the initial table position to one or more corresponding positions in the initial open table position of the network traffic handling table.

7. The method of claim 4, wherein at least one of the first classifier index and the second classifier index are identified from the data packet by one of reading the first classifier index from a segment of the data packet and deriving the classifier index from the data packet by applying a function to at least a portion of the data event.

8. The method of claim 7, wherein the function applied to at least the portion of the data event includes a hash function.

9. The method of claim 1, wherein the network traffic handling table includes a destination table configured to store entries containing addresses of one or more resources to which one or more data packets are to be directed, such that the address of the resource to which a data packet is to be delivered is retrieved from the destination table based on the classifier index associated with the data packet.

10. The method of claim 1, further comprising allowing multiple traffic management devices to update the network traffic handling table, wherein:
the traffic management devices manage mutually exclusive sets of first classifier indices and initial open table positions within the network traffic handling tables such that the first classifier indices and initial open table position being managed within the network traffic handling table cannot be updated by another traffic management device; and
the traffic management devices determine the initial table position associated with the first classifier index in the first dimension of the network traffic handling table by applying one of:
a dedicated classifier table dedicated for each traffic management device; and
a dedicated portion of the first classifier table for each traffic management device.

11. A method to provide uninterrupted access to a network traffic handling table during table updates, the method comprising:
receiving a data packet in one of a plurality of traffic management entities;
identifying a first classifier index associated with the data packet;
identifying a second classifier index associated with the data packet;
accessing a first classifier table to determine a first position in a first dimension of the network traffic handling table associated with the first classifier index, wherein the first classifier table references positions in the first dimension of the network traffic handling table that are mutually disjoint with other positions in the network traffic handling table managed by one or more other traffic management entities;
determining an open position in the first dimension of the table associated with the traffic management entity;
copying existing packet handling data from the current position to one or more corresponding locations in the second dimension in the open position in the network traffic handling table;
storing updated packet handling data within the open position in the network traffic handling table at a second dimension location indicated by the second classifier index;
associating the open position with the classifier index in the classifier table, wherein the open position becomes a new current position associated with the first classifier index; and
designating the current position previously associated with the first classifier index as a new open position in the network traffic handling table associated with the one traffic management entity.

12. The method of claim 11, further comprising determining the second dimension location indicated by the second classifier index by referencing a second classifier table associating a plurality of second dimension locations with a plurality of second classifier indices.

13. The method of claim 12, wherein at least one of the first classifier indices and the second classifier indices are identified from the data packet by one of:
reading the first classifier index from a segment of the data packet; and
deriving the classifier index from the data packet by applying a function to at least a portion of the data packet.

14. The method of claim 13, wherein the function applied to at least the portion of the data packet includes a hash function.

15. The method of claim 11, wherein the network traffic handling table includes a destination table configured to store entries containing addresses of one or more resources to which one or more data packets are to be directed, such that the address of the resource to which a data packet is to be delivered is retrieved from the destination table based on the classifier index associated with the data packet.

16. A non-transitory machine readable medium storing machine executable instructions, which when executed on one or more processors, causes a network traffic manager system to perform one or more instructions, the instructions comprising:
maintaining a first table configured to store data in a plurality of cells existing at intersections of positions in a first dimension of the first table and locations in a second dimension of the first table;
maintaining a classifier table for entities authorized to update the first table, wherein the maintaining of the classifier table includes:
associating the positions in the first dimension of the first table with a classifier index; and
receiving a classifier index update to associate a previously open position in the first dimension of the first table with a classifier index previously associated with an other position whose contents were superseded in the update;
and
maintaining an open position indicator for the entities authorized to update the first table, wherein the open position indicator is configured to:
indicate a position available to receive an update without writing in the positions associated with a classifier index in the classifier table; and
receive an open position update to identify the other position whose contents were superseded in the update.

17. A system for providing uninterrupted access to a network traffic handling table during table updates, the system comprising:
a first table configured to store data relating to a plurality of data events, the first table including a plurality of positions in a first dimension configured to store data associated with a classifier index and an open position configured to receive an update;

a classifier table configured to associate a plurality of classifier indices with positions in the first table; and an open position indicator configured to identify the open position; and a traffic management entity configured to:
  receive a data event;
  identify a first classifier index in the classifier table associated with the data event;
  consult the classifier table to identify a current position in the first table associated with the first classifier index;
  consult the open position indicator to identify the open position of the first table;
  store new data in the open position of the first table;
  update the classifier table to associate the first classifier index with the open position that has received the update; and
  update the open position indicator to identify the current position that was superseded by the update.

18. The system of claim 17, wherein the positions in the first dimension include a plurality of locations in a second dimension wherein the locations are identified by a second classifier index identified by the traffic management entity from the data event.

19. The system of claim 18, wherein the traffic management entity is further configured to copy existing data from the locations in the current position to corresponding locations in the open position before storing the new data in the open position.

20. The system of claim 18, wherein at least one of the first classifier index and the second classifier index are identified from the data event by one of:
  reading the first classifier index from a segment of the data event; and
  deriving the classifier index from the data event by applying a function to at least a portion of the data event.

21. The system of claim 20, wherein the function applied to at least the portion of the data event includes a hash function.

22. The system of claim 17, wherein:
  the first table includes a destination table having entries containing the address of one or more resources to which the data events are to be directed; and
  the data event includes a data packet.

23. The system of claim 17, further comprising a plurality of traffic management entities allowing more than one entity to update the first table, wherein:
  the traffic management entities manage mutually exclusive sets of first classifier indices and positions within the first table such that the first classifier indices and positions within the first table managed by the first traffic management entity cannot be updated by another traffic management entity; and
  the traffic management entities determine the current position in the first dimension of the first table associated with the first classifier index using one of:
  a dedicated classifier table dedicated to the traffic management entity; and
  a dedicated portion of the first classifier table.

24. A traffic manager device that provides uninterrupted access to a network traffic handling table during table updates, the apparatus comprising:
  a memory that stores a set of machine executable instructions;
  a network transceiver configured to receive network traffic;
  a processor configured to execute the set of stored computer executable instructions, the set of instructions comprising:
    receiving a data packet;
    identifying a first classifier index associated with the data packet;
    identifying a second classifier index associated with the data packet;
  accessing a first classifier table to determine a first position in a first dimension of the network traffic handling table associated with the first classifier index, wherein the first classifier table references positions in the first dimension of the network traffic handling table that are mutually disjoint with other positions in the network traffic handling table managed by one or more other entities;
  determining an open position in the first dimension of the table associated with the entity;
  copying existing packet handling data from the current position to one or more corresponding locations in the second dimension in the open position in the network traffic handling table;
  storing updated packet handling data within the open position in the network traffic handling table at a second dimension location indicated by the second classifier index;
  associating the open position with the classifier index in the classifier table, wherein the open position becomes a new current position associated with the first classifier index; and
  designating the current position previously associated with the first classifier index as a new open position in the network traffic handling table associated with the entity.

* * * * *